US012689756B2

(12) United States Patent (10) Patent No.: US 12,689,756 B2
Kim et al. (45) Date of Patent: Jul. 21, 2026

(54) HEURISTIC BASED CACHING PICTURES FOR VIDEO CODING

(71) Applicant: QUALCOMM Incorporated, San Diego, CA (US)

(72) Inventors: Younghoon Kim, San Diego, CA (US); George Patsilaras, San Diego, CA (US); Shengqi Yang, Carlsbad, CA (US); Tomoyuki Naito, San Diego, CA (US); Giwon Kim, San Diego, CA (US); Vladan Andrijanic, San Diego, CA (US); Vipul Gandhi, San Diego, CA (US); Jaemoon Kim, San Diego, CA (US); Aravind Bhaskara, San Diego, CA (US); Mohit Hari Bhave, San Diego, CA (US); Rohit Thulasiram, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/337,116

(22) Filed: Jun. 19, 2023

(65) Prior Publication Data

US 2024/0422336 A1 Dec. 19, 2024

(51) Int. Cl.
$$\begin{array}{ll}
\textit{H04N 19/423} & (2014.01) \\
\textit{H04N 19/105} & (2014.01) \\
\textit{H04N 19/159} & (2014.01) \\
\textit{H04N 19/172} & (2014.01)
\end{array}$$

(52) U.S. Cl.
CPC ......... *H04N 19/423* (2014.11); *H04N 19/105* (2014.11); *H04N 19/159* (2014.11); *H04N 19/172* (2014.11)

(58) Field of Classification Search
CPC .. H04N 19/423; H04N 19/105; H04N 19/159; H04N 19/172
See application file for complete search history.

(56) References Cited

U.S. PATENT DOCUMENTS

| | | | |
|---|---|---|---|
| 8,593,469 B2 | 11/2013 | Sriram et al. | |
| 9,253,496 B2 | 2/2016 | Nagaraj et al. | |
| 9,264,717 B2 | 2/2016 | Chen et al. | |

(Continued)

FOREIGN PATENT DOCUMENTS

| | | | | |
|---|---|---|---|---|
| CN | 113360687 A | * | 9/2021 | |
| CN | 115918071 A | * | 4/2023 | .............. G06N 3/04 |
| WO | 2023198753 A1 | | 10/2023 | |

OTHER PUBLICATIONS

Co-pending U.S. Appl. No. 18/337,109, inventor Kim; Giwon, filed Jun. 19, 2023.

(Continued)

*Primary Examiner* — Md N Haque
(74) *Attorney, Agent, or Firm* — Shumaker & Sieffert, P.A.

(57) ABSTRACT

A method includes determining a picture type of a current picture, determining, based on the picture type of the current picture, whether to write the current picture in a dedicated chip memory or whether to write the current picture a non-dedicated system memory, and writing the current picture in the dedicated chip memory or the non-dedicated system memory based on the determining of whether to write the current picture in the dedicated chip memory or whether to write the current picture in the non-dedicated system memory.

18 Claims, 8 Drawing Sheets

(56) References Cited

U.S. PATENT DOCUMENTS

| | | | |
|---|---|---|---|
| 10,516,891 B2 | 12/2019 | Lee et al. | |
| 10,542,276 B2 | 1/2020 | Qiu et al. | |
| 10,708,605 B2 | 7/2020 | He et al. | |
| 11,496,747 B2 | 11/2022 | Zhang et al. | |
| 11,595,667 B2 | 2/2023 | Zhou et al. | |
| 2008/0279280 A1 | 11/2008 | Iguchi et al. | |
| 2014/0348226 A1* | 11/2014 | Kurashige | H04N 19/436 |
| | | | 375/240.03 |
| 2017/0006303 A1 | 1/2017 | Sethuraman et al. | |
| 2017/0064309 A1* | 3/2017 | Sethuraman | H04N 19/577 |
| 2017/0150159 A1* | 5/2017 | Lee | H04N 19/52 |
| 2017/0188033 A1 | 6/2017 | Lin et al. | |
| 2018/0139461 A1 | 5/2018 | Liu et al. | |
| 2018/0376149 A1* | 12/2018 | Zhang | H04N 19/463 |
| 2019/0289319 A1* | 9/2019 | Mukherjee | H04N 19/109 |
| 2023/0054524 A1 | 2/2023 | Yang et al. | |
| 2023/0199171 A1* | 6/2023 | Hsiao | H04N 19/573 |
| | | | 375/240.02 |
| 2023/0336716 A1* | 10/2023 | Chang | H04N 19/11 |
| 2026/0039847 A1* | 2/2026 | Kim | H04N 19/423 |

OTHER PUBLICATIONS

Huang X., et al., "Improved Downstream Rate-Distortion Performance of SHVC in DASH using Sub-Layer-Selective Interlayer Prediction", 2015 IEEE 17th International Workshop on Multimedia Signal Processing (MMSP), Oct. 2015, 6 pages.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

International Search Report and Written Opinion—PCT/US2024/032271—ISA/EPO—Oct. 29, 2024 (13 pp).

* cited by examiner

Figure 5:
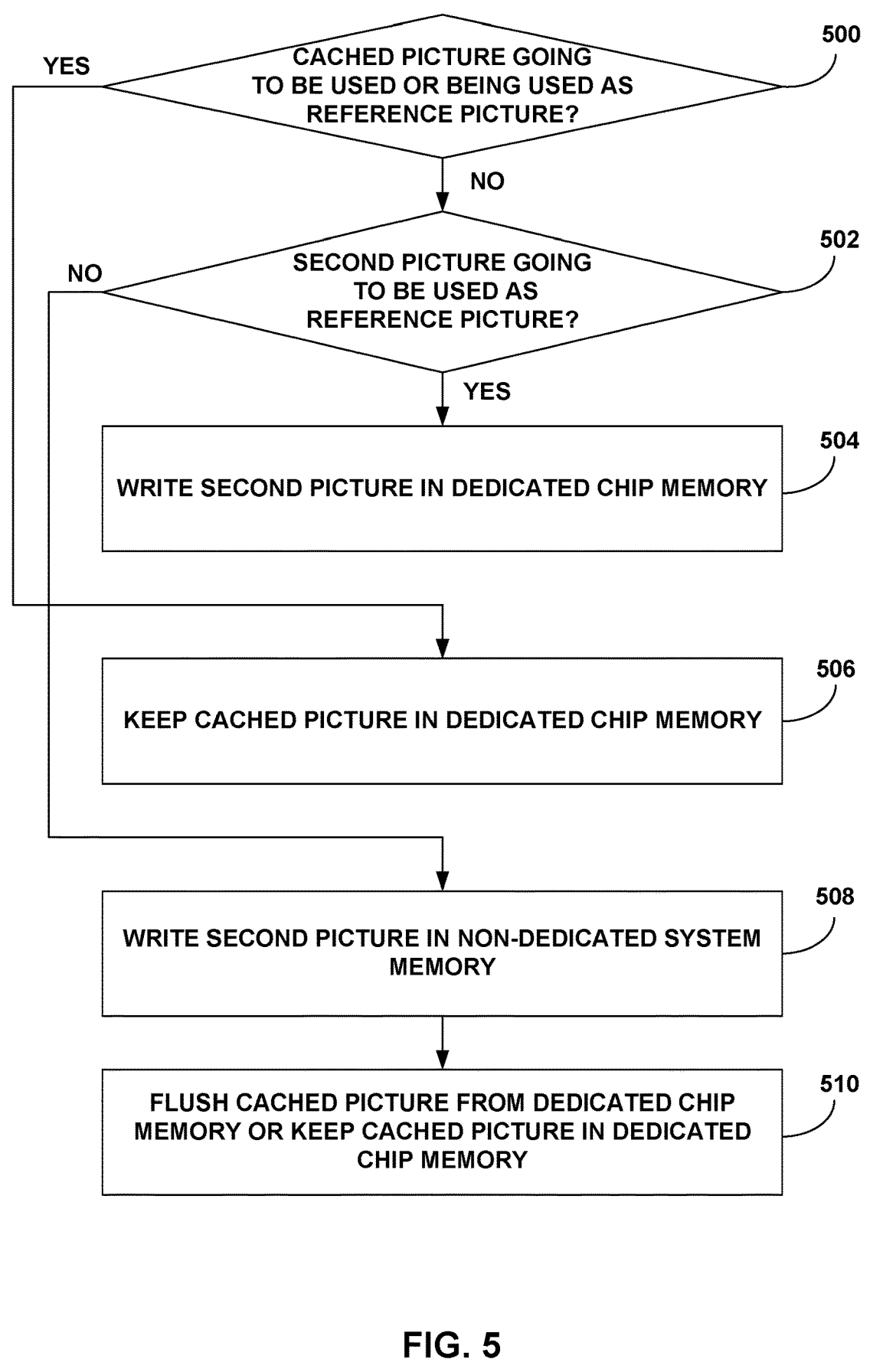

YES

CACHED PICTURE GOING TO BE USED OR BEING USED AS REFERENCE PICTURE? — 500

NO

NO

SECOND PICTURE GOING TO BE USED AS REFERENCE PICTURE? — 502

YES

WRITE SECOND PICTURE IN DEDICATED CHIP MEMORY — 504

KEEP CACHED PICTURE IN DEDICATED CHIP MEMORY — 506

WRITE SECOND PICTURE IN NON-DEDICATED SYSTEM MEMORY — 508

FLUSH CACHED PICTURE FROM DEDICATED CHIP MEMORY OR KEEP CACHED PICTURE IN DEDICATED CHIP MEMORY — 510

| Coding Order | I0 | P1 | P2 | P3 | P4 | P5 | P6 | P7 | P8 |
|---|---|---|---|---|---|---|---|---|---|
| Caching | I0 | I0 | I0 | I0 | I0 | P4 | P4 | P4 | P4 |

700

800

HEURISTIC BASED CACHING PICTURES FOR VIDEO CODING

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for determining whether to write a current picture in dedicated chip memory (e.g., cache) or non-dedicated system memory (e.g., random access memory (RAM)) based on a plurality of heuristics. Examples of the heuristics include picture type (e.g., I-picture, P-picture, or B-picture), whether a picture stored in dedicated chip memory is no longer used for inter-prediction, and other heuristics. As one example, a video encoder or video decoder may determine a picture type of a current picture (e.g., prior to, during, or after encoding or decoding the current picture). Based on the picture type, the video encoder and the video decoder may determine whether to write the current picture in a dedicated chip memory or a non-dedicated system memory. The video encoder and the video decoder may then access the current picture from the dedicated chip memory or the non-dedicated system memory if the current picture is a reference picture for inter-predicting another picture.

Accessing a picture from dedicated chip memory may require less bandwidth and power, as compared to accessing a picture from non-dedicated system memory. The picture type of the current picture may correlate with how frequently and/or likely the current picture is going to be accessed in the future as a reference picture for inter-predicting another picture. By determining to write pictures that are estimated to more frequently be accessed as reference pictures in dedicated chip memory, the example techniques may reduce power and bandwidth consumption due to more frequent access of the dedicated chip memory and reduced access of the non-dedicated system memory.

In one example, the disclosure describes a method of processing video data, the method comprising: determining a picture type of a current picture; determining, based on the picture type of the current picture, whether to write the current picture in a dedicated chip memory or whether to write the current picture a non-dedicated system memory; and writing the current picture in the dedicated chip memory or the non-dedicated system memory based on the determining of whether to write the current picture in the dedicated chip memory or whether to write the current picture in the non-dedicated system memory.

In one example, the disclosure describes a device for processing video data, the device comprising: a dedicated chip memory; and processing circuitry coupled to the dedicated chip memory and configured to: determine a picture type of a current picture; determine, based on the picture type of the current picture, whether to write the current picture in the dedicated chip memory or whether to write the current picture a non-dedicated system memory; and write the current picture in the dedicated chip memory or the non-dedicated system memory based on the determining of whether to write the current picture in the dedicated chip memory or whether to write the current picture in the non-dedicated system memory.

In one example, the disclosure describes one or more computer-readable storage media storing instructions thereon that when executed cause one or more processors to: determine a picture type of a current picture; determine, based on the picture type of the current picture, whether to write the current picture in a dedicated chip memory or whether to write the current picture a non-dedicated system memory; and write the current picture in the dedicated chip memory or the non-dedicated system memory based on the determining of whether to write the current picture in the dedicated chip memory or whether to write the current picture in the non-dedicated system memory.

In one example, the disclosure describes a device for processing video data, the device comprising: means for determining a picture type of a current picture; means for determining, based on the picture type of the current picture, whether to write the current picture in a dedicated chip memory or whether to write the current picture a non-dedicated system memory; and means for writing the current picture in the dedicated chip memory or the non-dedicated system memory based on the determining of whether to write the current picture in the dedicated chip memory or whether to write the current picture in the non-dedicated system memory.

The details of one or more examples are set forth in the accompanying drawings and the description below. Other features, objects, and advantages will be apparent from the description, drawings, and claims.

BRIEF DESCRIPTION OF DRAWINGS

FIG. 5 is a flowchart illustrating another example method of processing video data.

DETAILED DESCRIPTION

Figure 1:
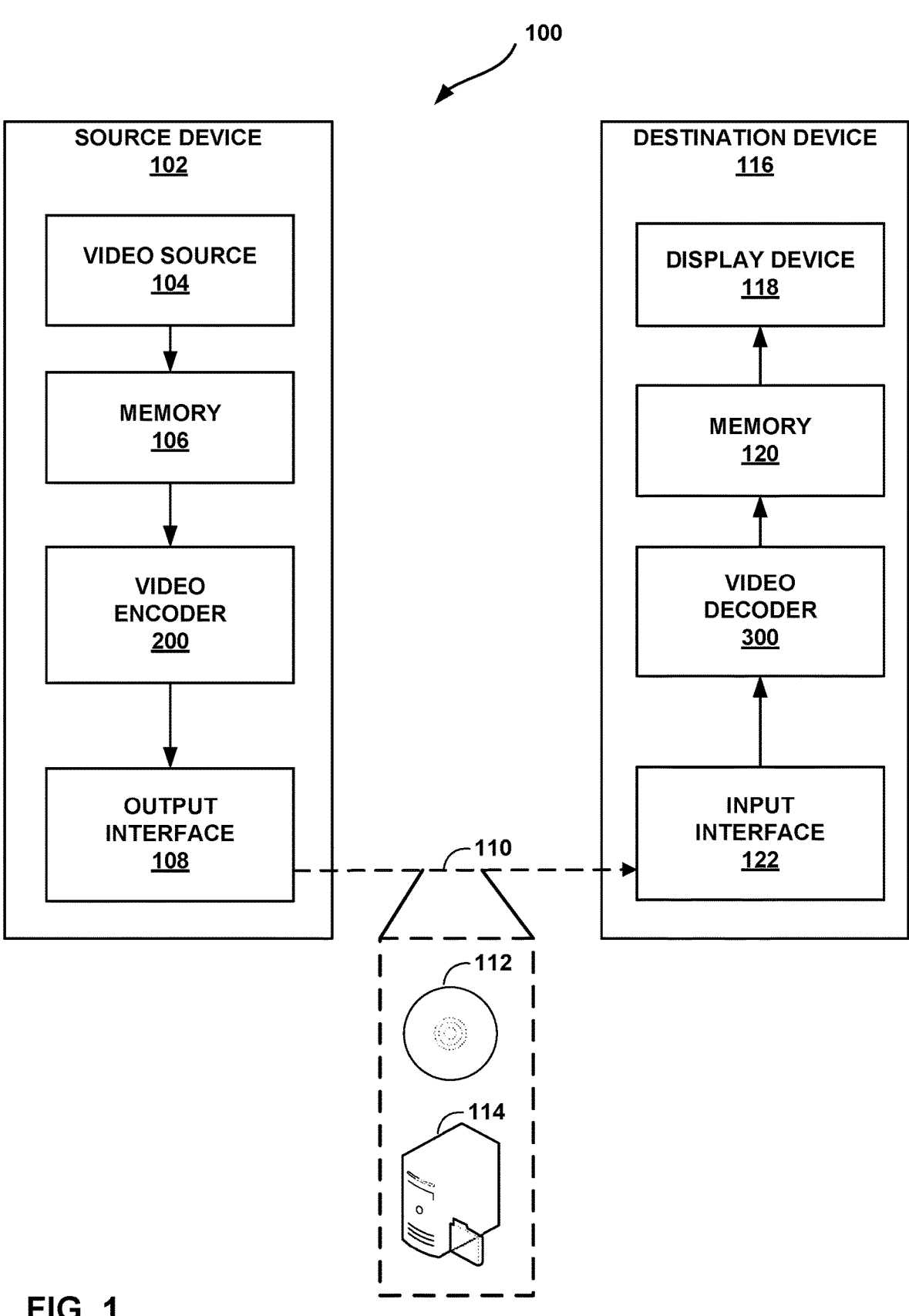
FIG. 1 is a block diagram illustrating an example video encoding and decoding system that may perform the techniques of this disclosure.

Inter-prediction is an example video encoding or decoding technique for encoding or decoding a current block in a current picture. In inter-prediction, a video encoder or video decoder determine a reference block in a reference picture. The video encoder or video decoder may generate a prediction block from the reference block (e.g., by filtering, etc.). In some examples, the prediction block and reference block are the same blocks. The video encoder determines residual information indicative of a difference between samples of the prediction block and the current block, and signals the residual information. The video decoder receives the residual information, and adds the residual information to the prediction block to reconstruct the current block.

The video encoder and video decoder write the current picture to memory. The current picture can then be a reference picture for encoding or decoding one or more future pictures. Future pictures refer to pictures that follow the current picture in coding order (i.e., are encoded or decoded after the current picture).

For the video encoder or video decoder, there may be different types of memory that are available for writing the current picture. For instance, an integrated circuit (IC) chip that includes the video encoder and/or video decoder may have dedicated chip memory, which may be on-chip or off-chip and accessible by a dedicated bus. The dedicated chip memory may be shared by components of the IC chip, but may not be accessible by other chips. One example of the dedicated chip memory is cache memory. The dedicated chip memory is one example of memory to which the video encoder or video decoder may write the current picture.

Also, the system that includes the IC chip may include non-dedicated system memory. For instance, the IC chip may be part of a larger system (e.g., phone, tablet, laptop, etc.), and there may be system memory that is shared by the components of the system, and need not be dedicated to the IC chip. Random access memory (RAM) is an example of non-dedicated system memory. The non-dedicated system memory is another example of memory to which the video encoder or video decoder may write the current picture.

In general, writing and reading from the dedicated chip memory requires less power and access time compared to writing and reading from the non-dedicated system memory. Therefore, there may be benefit in writing the current picture in dedicated chip memory so that if the current picture is used as a reference picture, the current picture can be read more quickly and with less power than if the current picture were stored in non-dedicated system memory. However, there may be a limit to the memory size of the dedicated chip memory, and the dedicated chip memory is typically smaller than non-dedicated system memory. The dedicated chip memory may not be sized to store a large number of pictures. In some cases, the dedicated chip memory may be able to store one picture.

This disclosure describes example techniques for determining whether to write the current picture in the dedicated chip memory or the non-dedicated system memory. For instance, the video encoder and the video decoder may determine metrics indicative of how frequently the current picture is predicted to be used as a reference picture for future pictures, and how frequently a cached picture (i.e., a picture already stored in the dedicated chip memory) is predicted to be used as a reference picture for future pictures. Based on the determined metrics, the video encoder and video decoder may determine whether to write the current picture in the dedicated chip memory or the non-dedicated system memory.

The video encoder and the video decoder may determine which pictures maximize power and bandwidth benefits when stored in dedicated chip memory. For instance, writing pictures that have a higher likelihood of re-use to dedicated chip memory may result in power and bandwidth benefits as compared to writing such pictures in non-dedicated system memory or writing pictures with lower likelihood of re-use being written to dedicated chip memory.

The video encoder and the video decoder may utilize heuristics to determine whether a picture is to be written to dedicated chip memory or non-dedicated system memory. Examples of the heuristics include picture type (e.g., whether a picture is an intra-prediction type, uni-direction prediction type, or bi-prediction type), whether cached picture stored in the dedicated chip memory is going to be or is being used as a reference picture, whether the current picture that is to be encoded or decoded is going to be used as a reference picture, and/or other heuristics.

An intra-prediction type picture, also called I-picture, refers to a picture that is encoded or decoded based on samples within the picture and no samples from another picture. A uni-direction prediction type picture, also called P-picture, refers to a picture that is encoded or decoded based on samples within one other picture, referred to as a reference picture. A bi-prediction type picture, also called B-picture, refers to a picture that is encoded or decoded based on samples from two different reference pictures.

In some examples, the heuristics may define that an I-picture is always stored in the dedicated chip memory. As another example, the heuristics may define a priority level for a picture based on the picture type. For example, an I-picture may have the highest priority level, a P-picture may have a medium priority level, and a B-picture may have a lowest priority level. In one or more examples, the video encoder and the video decoder may compare a priority level associated with a current picture (e.g., based on the picture type of the current picture) to a priority level associated with a cached picture currently stored in the dedicated chip memory (e.g., based on the picture type of the cached picture). Based on the comparison, the video encoder and the video decoder may determine whether to write the current picture to the dedicated chip memory or the non-dedicated system memory.

The video encoder and the video decoder may write the current picture to the dedicated chip memory under a condition that that the cached picture (e.g., the picture that is currently stored in the dedicate chip memory) is not being used and/or is not going to be used as a reference picture. For example, if the cached picture is being used as a reference picture for the current picture, then, as the current picture is being encoded or decoded, it may not be practical to overwrite the cached picture in the dedicated chip memory because portions of the cached picture may be needed for purposes encoding or decoding the current picture.

Another heuristic may be whether the cached picture is going to be used as a reference picture or not. For instance, if the cached picture is going to be used as a reference picture, even after the encoding or decoding of the current picture, the video encoder or the video decoder may not flush the cached picture from the dedicated chip memory. However, if the cached picture is not going to be used as a reference picture (e.g., the cached picture is expired), the video encoder and the video decoder may write the current picture to the dedicated chip memory, thereby overwriting the cached picture in the dedicated chip memory.

As another example heuristic, the video encoder and the video decoder may write the current picture to the dedicated chip memory only if the current picture is going to be used as a reference picture for another picture. For instance, if the current picture is not going to be used as a reference picture, there may be little to no benefit in writing the current picture to dedicated chip memory.

The various example heuristics may be weighted differently, and the example techniques contemplate the various ways in which the heuristics may be weighted. For instance, if the current picture is not going to be used as a reference picture, then regardless of the picture type of the current picture, the video encoder and the video decoder may not write the current picture to the dedicated chip memory. As another example, if the cached picture is not going to be used as a reference picture, then regardless of the picture type of the current picture, but based on a determination that the current picture is going to be used as a reference picture, the video encoder and the video decoder may write the current picture to the dedicated chip memory. As yet another example, if the current picture is an I-picture, then regardless of whether the cached picture is going to be used as a reference picture, the video encoder and the video decoder may write the current picture to the dedicated chip memory (e.g., because there is a high likelihood that the current picture will be accessed more often as a reference picture than the cached picture).

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for determining whether to write a picture in dedicated chip memory or non-dedicated system memory. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for determining whether to write picture in dedicated chip memory or non-dedicated system memory. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, iLBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that uses inter-prediction coding.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre-and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUS) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra-or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, video encoder 200 and video decoder 300 may determine whether to write a current picture in dedicated chip memory or non-dedicated system memory. Dedicated chip memory may be memory that video encoder 200 and video decoder 300 can access quickly with relatively low power compared to non-dedicated system memory. Examples of dedicated chip memory include on-chip cache memory of the integrated circuit (IC) chip that includes video encoder 200 or video decoder 300. The dedicated chip memory may be shared by components within the IC chip, but not by components external to the IC chip. Examples of non-dedicated system memory includes off-chip memory such as random access memory (RAM).

As described above, one of the video coding techniques is inter-prediction, in which video encoder 200 and video decoder 300 may access a reference picture (e.g., a previously coded picture) to encode or decode a current block of a current picture. That is, video encoder 200 and video decoder 300 may generate a prediction block, from samples of the reference picture, used for encoding or decoding. The amount of time and power needed to access the reference picture may be based on whether the reference picture is stored in the dedicated chip memory or the non-dedicated system memory, where less time and power are needed to access the reference picture form the dedicated chip memory.

In one or more examples, video encoder 200 and video decoder 300 may determine whether a current picture should be stored in the dedicated chip memory or the non-dedicated system memory. In some examples, video encoder 200 and video decoder may determine whether the current picture should be stored in the dedicated chip memory or the non-dedicated system memory even before encoding or decoding the current picture. However, it may be possible to determine whether the current picture should be stored in the dedicated chip memory or the non-dedicated system memory after or during the encoding or decoding of the current picture.

Video encoder 200 and video decoder 300 may determine whether to write the current picture in the dedicated chip memory or the non-dedicated system memory based on example heuristics that may result in video encoder 200 and video decoder 300 writing pictures to dedicated chip memory with higher re-uses (e.g., multiple picture reads as reference pictures). Examples of the heuristics include: (1) video encoder 200 and video decoder 300 may only write pictures to dedicated chip memory that are used as reference pictures in the future; (2) video encoder 200 and video decoder 300 may always write pictures having an intra-prediction type (i.e., I-pictures) to dedicated chip memory; (3) after a cached picture (e.g., picture currently stored in the dedicated chip memory) is no longer needed for inter-prediction (e.g., the cached picture has expired), video encoder 200 and video decoder 300 may write to the dedicated chip memory the next picture; and (4) video encoder 200 and video decoder 300 may write a picture to dedicated chip memory based on a priority level of the picture associated with the picture type of the picture (e.g., intra-prediction type has highest priority, uni-direction prediction type has medium priority, and bi-prediction type has lowest priority).

Pictures that are of the intra-prediction type are referred to as I-pictures. An I-picture is a picture that is encoded or decoded using samples in the picture itself, and not samples from other pictures. Pictures that are of the uni-direction prediction type are referred to as P-pictures. A P-picture is a picture that is encoded or decoded based on samples within one other picture, referred to as a reference picture. For example, video encoder 200 or video decoder 300 construct a reference picture list, and the reference picture is one of the pictures identified in the reference picture list (e.g., based on an index into the reference picture list). Pictures that are of the bi-prediction type are referred to as B-pictures. A B-picture is a picture that is encoded or decoded based on samples from two different reference pictures. For example, video encoder 200 or video decoder 300 constructs two reference picture lists, called list 0 and list 1. For a B-picture, a first reference picture is identified in list 0, and a second reference picture is identified in list 1; however, it may be possible that both reference pictures are identified in list 0 or in list 1.

In some examples, a picture may include different slices having different prediction modes. For example, a picture may include some blocks that bi-prediction type predicted (B-blocks), some blocks that are uni-direction predicted (P-blocks), some blocks that are intra-predicted (I-blocks), or some combination thereof. In such examples, video encoder 200 and video decoder 300 may determine a slice type (e.g., where a slice includes a plurality of blocks) of a first slice in the picture based on a slice header of the first slice that defines whether the blocks in the slice are I-blocks, P-blocks, or B-blocks. Based on the slice type of the first slice, video encoder 200 and video decoder 300 may classify the picture that includes the first slice as a I-picture, P-picture, or B-picture.

As another example, if any slice in a picture is a B-slice (e.g., slice includes B-blocks), video encoder 200 and video decoder may classify the picture as a B-picture. If all slices in a picture is a P-slice (e.g., slices include P-blocks), video encoder 200 and video decoder may classify the picture as a B-picture. If all slices in a picture is an I-slice (e.g., slices include I-blocks), video encoder 200 and video decoder may classify the picture as an I-picture. As another example, video encoder 200 and video decoder 300 may determine which one of the I-blocks, P-blocks, or B-blocks form a majority of blocks, and classify the picture based on the blocks that form a majority. If there is a tie, video encoder 200 and video decoder 300 may classify the picture as a B-picture if tie between B-blocks and P-blocks or I-blocks, or as a P-picture if tie between P-blocks and I-blocks. Other examples are possible as well to classify a picture as an I-picture, P-picture, or B-picture.

There may be more heuristics than the example heuristics described above. It may not be necessary to utilize all of the example heuristics. Moreover, the heuristics may be weighted, such as where there is a conflict, one of the heuristics may be defined to control. As an example, one heuristic is that video encoder 200 and video decoder 300 only write pictures that are used as reference pictures to the dedicated chip memory, and another heuristic is that video encoder 200 and video decoder 300 always write intra-prediction type pictures (i.e., I-pictures) to dedicated chip memory.

A scenario may arise where an I-picture is not used as a reference picture, causing a conflict in the heuristics. Video encoder 200 and video decoder 300 may be preprogrammed to or, based on other information, configured to give more weight to one heuristic over the other. For instance, in this example scenario, video encoder 200 and video decoder 300 may weight the heuristic of only writing pictures that are used as reference pictures to the dedicated chip memory more than the heuristic of always writing I-pictures to dedicated chip memory. In this example, video encoder 200 and video decoder 300 may determine to not write the I-picture to dedicated chip memory.

As described above, one of the heuristics may be based on picture type. That is, video encoder 200 and video decoder 300 may determine a picture type of a current picture, and determine, based on the picture type of the current picture, whether to write the current picture in a dedicated chip memory or a non-dedicated system memory. As an example, if the current picture is an I-picture (e.g., of the intra-prediction type), video encoder 200 and video decoder 300 may determine to write the current picture in the dedicated chip memory.

In some examples, video encoder 200 and video decoder 300 may account for the picture type of the current picture and the picture type of the cached picture (i.e., picture currently stored in the dedicated chip memory) to determine whether to write the current picture in the dedicated chip memory or the non-dedicated system memory. For instance, assume that the picture type of the current picture is a first picture type (e.g., one of an I-picture, P-picture, or B-picture), and assume that the picture type of the cached picture is a second picture type (e.g., another of an I-picture, P-picture, or B-picture).

Video encoder 200 and video decoder 300 may compare a first priority level associated with the first picture type to a second priority level associated with the second picture type, and determine whether to write the current picture in the dedicated chip memory or the non-dedicated system memory based on the comparison of the first priority level to the second priority level. For instance, the first priority level is indicative of a higher priority than the second priority level based on the first picture type being an intra-prediction picture type (i.e., current picture is an I-picture) and the second picture type being a uni-direction prediction type (i.e., cached picture is a P-picture). The first priority level is indicative of a higher priority than the second priority level based on the first picture type being the intra-prediction picture type (i.e., current picture is an I-picture) and the second picture type being a bi-direction prediction type (i.e., cached picture is a B-picture). The first priority level is indicative of a higher priority than the second priority level based on the first picture type being the uni-direction prediction picture type (i.e., current picture is a P-picture) and the second picture type being the bi-direction prediction type (i.e., cached picture is a B-picture). Stated another way, the priority level based on the picture types may be as follows: I-picture>P-picture>B-picture.

The example priority level hierarchy described above is based on I-pictures being more likely to be used as reference pictures, as compared to P-pictures or B-pictures, and P-pictures being more likely to be used as reference pictures, as compared to B-pictures. For instance, each picture may be associated with a temporal identification value (temporalID). Pictures having a particular temporalID can be reference pictures for other pictures having the same or greater temporalID.

The temporalID is used for picture dropping for bandwidth efficiencies. For example, pictures having the highest temporalID may be dropped from the bitstream without impacting the ability of the video decoder to reconstruct other pictures because the pictures having the highest temporalID cannot be used to reconstruct any of the pictures left in the bitstream. In general, B-pictures tend to have the higher temporalIDs as compared to I-pictures or P-pictures, and therefore, there may be less benefit in writing B-pictures to the dedicated chip memory, as compared to I-pictures or P-pictures. P-pictures tend to have the higher temporalIDs as compared to I-pictures, and therefore, there may be less benefit in writing P-pictures to the dedicated chip memory, as compared to I-pictures.

In the above example, if the first priority level of the first picture type of the current picture is lower than the second priority level of the second picture type of the cached picture, video encoder 200 and video decoder 300 may not write the current picture to the dedicated chip memory, and instead write the current picture to the non-dedicated system memory. However, if the first priority level of the first picture type of the current picture is greater than the second priority level of the second picture type of the cached picture, video encoder 200 and video decoder 300 may write the current picture to the dedicated chip memory, and not to the non-dedicated system memory.

However, even in instances where priority level of the current picture indicates that the current picture should be written to the dedicated chip memory, video encoder 200 and video decoder 300 may elect not to write the current picture to the dedicated chip memory. For instance, if the cached picture is being used as a reference picture for the current picture, as video encoder 200 encodes or video decoder 300 decodes the current picture, video encoder 200 and video decoder 300 may need to access the cached picture. In this case, if video encoder 200 or video decoder 300 overwrite the cached picture as blocks of the current picture are being encoded or decoded, samples from the cached picture needed for encoding or decoding subsequent blocks of the current picture may become overwritten.

That is, video decoder 300 may reconstruct the current picture, and may write the current picture to the dedicated chip memory or the non-dedicated system memory during the reconstruction of the current picture. For instance, as samples, blocks, slices, etc. of the current are being reconstructed, video decoder 300 may write the samples, blocks, slices etc. of the current picture to the dedicated chip memory or the non-dedicated system memory. In one or more examples, if the cached picture is being used for inter-predicting the current picture, then video decoder 300 may not write samples of the current picture to the dedicated chip memory, even if other heuristics indicate that the current picture should be written to the dedicated chip memory.

As described in more detail, video encoder 200 may include a reconstruction loop, in which video encoder 200 reconstructs the current picture. Video encoder 200 may write the current picture to the dedicated chip memory or the non-dedicated system memory during the reconstruction of the current picture. Similar to video decoder 300, if the cached picture is being used for inter-predicting the current picture, then video encoder 200 may not write samples of the current picture to the dedicated chip memory, even if other heuristics indicate that the current picture should be written to the dedicated chip memory.

As described above, one heuristic may be the picture type. Another heuristic may be whether the cached picture is going to be used as a reference picture or not. For instance, if the cached picture is going to be used as a reference picture, even after the encoding or decoding of the current picture, video encoder 200 or video decoder 300 may not flush the cached picture from the dedicated chip memory. However, if the cached picture is not going to be used as a reference picture (e.g., the cached picture is expired), video encoder 200 and video decoder 300 may write the current picture to the dedicated chip memory, thereby overwriting the cached picture in the dedicated chip memory.

However, as an exception, and a scenario where there may be conflict in the heuristics, if the cached picture is going to be used as a reference picture, and the current picture is an I-picture, video encoder 200 and video decoder 300 may determine to write the current picture to the dedicated chip memory. For instance, there may be possibility that even though the cached picture is going to be used as a reference picture, the current picture (e.g., the I-picture) is going to be used as a reference picture more often than the cached picture. Therefore, there may be benefit in writing the current picture to the dedicated chip memory even though the cached picture is going to be used as a reference picture.

As another example heuristic, video encoder 200 and video decoder 300 may write the current picture to the dedicated chip memory only if the current picture is going to be used as a reference picture for another picture. For instance, if the current picture is not going to be used as a reference picture, there may be little to no benefit in writing the current picture to dedicated chip memory.

As explained above, whether a picture is going to be used as a reference picture or not is a heuristic in determining whether that picture is to be written to dedicated chip memory or non-dedicated system memory. There may be various ways in which to determine whether a picture is going to be used as a reference picture or not. For instance, from the perspective of video encoder 200, video encoder 200 may have determined which pictures are going to be reference pictures based on rate-distortion or other such calculations. However, from the perspective of video decoder 300, video decoder 300 may not know ahead which pictures are reference pictures.

In some examples, even though which pictures are going to be reference pictures may not be known to video decoder 300, video decoder 300 may receive information from which video decoder 300 can predict whether a picture is going to be a reference picture. As one example, video decoder 300 may receive a bitstream with video data that video decoder

300 uses to reconstruct pictures. Prior to decoding the current picture, video decoder 300 may have stored additional portions of the bitstream (e.g., buffered the bitstream) that includes information for decoding future pictures. Video decoder 300 may access that additional portion to determine whether the current picture is used as a reference picture or not.

For example, the additional portion of the bitstream may include information such as motion vectors for future pictures that define to which picture the future pictures refer. Video decoder 300 may utilize this motion vector information to determine if the current picture is a reference picture or not.

As another example, the additional portion of the bitstream may include information such as reference picture set information, where a reference picture set defines pictures that can, but not necessarily will, be used as reference pictures. Video decoder 300 may access the reference picture set information to determine if the current picture is a reference picture or not. For example, if the current picture is not identified in the reference picture set for any of the future pictures, then the current picture cannot be a reference picture. However, if the current picture is identified in the reference picture set, there is a chance that the current picture will be a reference picture.

In some examples, video decoder 300 may leverage the repetitiveness in the coding structure (e.g., structure that defines which picture are used as reference pictures) in the bitstream. For example, the current picture may belong to a second set of pictures. Video decoder 300 may utilize information of a coding structure of a first set of pictures that precede the second set of pictures in decoding order to determine the coding structure of the second set of pictures. As an example, if picture N-2 is a reference picture for picture N in the first set of pictures, then it is likely, but not guaranteed, that picture N-2 is a reference picture for picture N in the second set of pictures that include the current picture.

Video decoder 300 may identify the picture in the first set of pictures that is co-located in coding order with the current picture in the second of pictures. If the identified picture in the first set of pictures is a reference picture, then video decoder 300 may determine that the current picture is going to be a reference picture.

For example, in a video sequence being decoded in the bitstream, there may be a plurality of sets of pictures. The set of pictures is one example of a coding structure having a set of properties. For instance, the size of a plurality of sequential sets of pictures may be same. As another example, a first instantaneous decoder refresh (IDR) picture and a second IDR picture may define ends of the first set of pictures and the second set of pictures, and the first set of pictures may be the first half of pictures between the first IDR picture and the second IDR picture, and the second set of pictures may be the second half of the pictures between the first IDR picture and the second IDR picture. In some examples, each set of pictures may start with an IDR picture. In some examples, a picture in a set of pictures may not be inter-predicted with a reference picture in another set of pictures. The set of pictures may be an example of a group of pictures (GOP) structure, such as those in H.264 or AV1, but example techniques are not limited to GOP of H.264 or AV1.

In some examples, the structure profile of a first set of pictures may be the same as the structure profile of a second set of pictures. For instance, assume that the second set of pictures includes the current picture and future pictures (e.g., pictures coded after the current picture), and the first set of pictures includes previous pictures (e.g., pictures previously coded). There may be associated pictures in the first set of pictures and the second set of pictures. An associated picture in the second set of pictures may be in the same coding order in the second set of pictures as a previous picture in the first set of pictures. For instance, the first picture in coding order in the first set of pictures is associated with the first picture in coding order in the second set of pictures. The second picture in coding order in the second set of pictures is associated with the second picture in coding order in the second set of pictures, and so forth.

Because video decoder 300 had already reconstructed pictures in the first set of pictures, video decoder 300 may have already determined whether a picture in the first set of pictures was used as a reference picture or not. Based on associations of pictures in the first set of pictures and the second set of pictures, video decoder 300 may determine whether a current picture in the second set of pictures is going to be used as a reference picture based on the whether an associated picture, of the current picture, in the first set of pictures was used as a reference picture.

Using the coding structure of the first set of pictures to determine whether the current picture is used as a reference picture may be a prediction. That is, it may be possible that video decoder 300 determines that the current picture is going to be used as a reference picture, but the current picture does not end up being used as a reference picture. In this case, video decoder 300 may write the current picture in the dedicated chip memory unnecessarily. The result of unnecessarily writing the current picture to the dedicated chip memory may be a "cache miss," where video decoder 300 is able to retrieve the actual reference picture from non-dedicated system memory. Although, this may result in slightly increased access to the non-dedicate system memory in certain cases, the likelihood that the prediction that the current picture will be used as a reference picture based on the associated picture may be large enough to counterbalance instances of cache misses.

Video decoder 300 may utilize the above techniques to also determine whether the cached picture is going to be used as a reference picture or not. That is, a cached picture may be used as a reference picture for some pictures, but then, at some point, the cached picture is no longer going to be used as a reference picture. This is referred to as the cached picture expiring. Video decoder 300 may utilize the above techniques to determine whether a cached picture has expired.

However, various video coding standards may also define ways in which to determine if a picture has expired, and video encoder 200 and video decoder 300 may utilize techniques defined in the video coding standards to determine if a picture has expired. As one example, section C.3.2 "Removal of pictures from DPB" in the HEVC video coding standard defines ways in which to determine if a picture is no longer going to be used as a reference picture. As another example, section C.3.2 "Removal of picture from DPB before decoding of the current picture" in the VVC video coding standard defines ways in which to determine if a picture is no longer going to be used as a reference picture.

Accordingly, in one or more examples, video encoder 200 and video decoder 300 may determine that a cached picture stored in the dedicated chip memory is not going to be used as a reference picture (e.g., using any of the above example techniques). Video encoder 200 and video decoder 300 may determine to write the current picture in the dedicated chip memory based on the determination that the cached picture is not going to be used as the reference picture.

However, as described above, another heuristic may be that video encoder 200 and video decoder 300 may determine to write a picture to the dedicated chip memory only if the picture is going to be used as a reference picture. In some examples, video encoder 200 and video decoder 300 may determine that the current picture is going to be used as the reference picture, and determine to write the current picture in the dedicated chip memory based on the determination that the cached picture is not going to be used as the reference picture and the current picture is going to be used as the reference picture. If the current picture were not going to be used as a reference picture, video encoder 200 and video decoder 300 may not write the current picture to the dedicated chip memory. Video encoder and video decoder 300 may still, optionally, flush the dedicated chip memory because the cached picture is also not going to be used as a reference picture, and therefore, there may be little to no benefit in keeping the currently cached picture in the dedicated chip memory.

Figure 2:
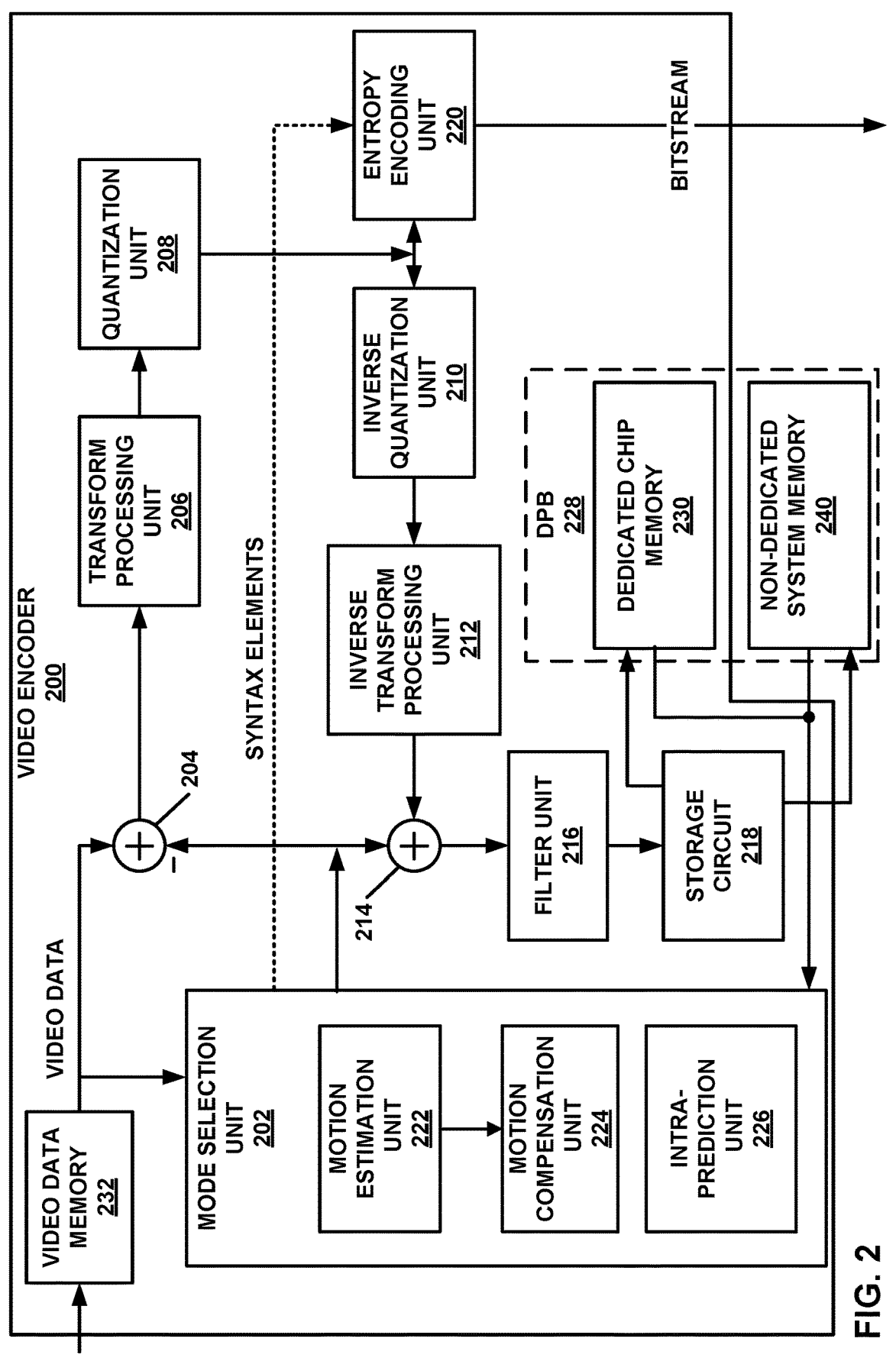
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 2, video encoder 200 includes video data memory 232, mode selection unit 202, residual generation unit 204, transform processing unit 206, quantization unit 208, inverse quantization unit 210, inverse transform processing unit 212, reconstruction unit 214, filter unit 216, storage circuit 218, decoded picture buffer (DPB) 228, and entropy encoding unit 220. Any or all of video data memory 232, mode selection unit 202, residual generation unit 204, transform processing unit 206, quantization unit 208, inverse quantization unit 210, inverse transform processing unit 212, reconstruction unit 214, filter unit 216, storage circuit 218, DPB 228, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

In the example of FIG. 2, DPB 228 includes dedicated chip memory 230 and non-dedicated system memory 240. In some examples, dedicated chip memory 230, such as cache memory, may be internal to the integrated circuit (IC) chip that includes video encoder 200. Non-dedicated system memory 240 may be external to the IC chip, and may be shared by components other than those of the IC chip that includes video encoder 200. As described in more detail, DPB 228 stores pictures that can be used as reference pictures. In accordance with one or more example, storage circuit 218 may determine whether to write a current picture being encoded to dedicated chip memory 230 or non-dedicated system memory 240 based on one or more heuristics such as picture types of the current picture and/or cached picture (e.g., picture stored in dedicated chip memory 230), whether the cached picture is or is going to be used as a reference picture (e.g., used for inter-prediction), etc. Storage circuit 218 may determine whether to write a current picture being encoded to dedicated chip memory 230 or non-dedicated system memory 240 prior to encoding the current picture, during the encoding of the current picture, or after encoding the current picture.

Video data memory 232 may store video data to be encoded by the components of video encoder 200. Video encoder 200 may receive the video data stored in video data memory 232 from, for example, video source 104 (FIG. 1). DPB 228 may act as a reference picture memory that stores reference video data for use in prediction of subsequent video data by video encoder 200. Video data memory 232 and non-dedicated system memory 240 of DPB 228 may be formed by any of a variety of memory devices, such as dynamic random access memory (DRAM), including synchronous DRAM (SDRAM), magnetoresistive RAM (MRAM), resistive RAM (RRAM), or other types of memory devices. Dedicated chip memory 230 may be formed as cache memory (e.g., L1 or L2 cache, or last-level cache). In various examples, DPB 228, at least partially, may be on-chip with other components of video encoder 200, as illustrated, or, at least partially, off-chip relative to those components, as illustrated.

In this disclosure, reference to video data memory 232 should not be interpreted as being limited to memory internal to video encoder 200, unless specifically described as such, or memory external to video encoder 200, unless specifically described as such. Rather, reference to video data memory 232 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 232 is configured to store received video data. Video encoder 200 may retrieve a picture of the video data from video data memory 232 and provide the video data to residual generation unit 204 and mode selection unit 202. Video data in video data memory 232 may be raw video data that is to be encoded. Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUS, prediction modes for the CUS, transform types for residual data of the CUS, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 232 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 228). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 232 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Video encoder 200 includes a reconstruction loop in which an encoded current picture is reconstructed and stored in DPB 228. This way, the current picture is available as a reference picture for future pictures. The reconstruction loop includes inverse quantization unit 210, inverse transform processing unit 212, reconstruction unit 214, and optionally filter unit 216.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 228. For instance, in examples where operations of filter unit 216 are not performed, reconstruction unit 214 may store reconstructed blocks to DPB 228. In examples where operations of filter unit 216 are performed, filter unit 216 may store the filtered reconstructed blocks to DPB 228. Motion estimation unit 222 and motion compensation unit 224 may retrieve a reference picture from DPB 228, formed from the reconstructed (and potentially filtered) blocks, to inter-predict blocks of subsequently encoded pictures. In addition, intra-prediction unit 226 may use reconstructed blocks in DPB 228 of a current picture to intra-predict other blocks in the current picture.

In one or more examples described in this disclosure, storage circuit 218 may determine whether reconstructed blocks of the current picture are to be stored in dedicated chip memory 230 or non-dedicated system memory 240 based on one or more heuristics. For instance, mode selection unit 202 may be configured to determine a picture type of the current picture (e.g., comprises one of an intra-prediction picture type (I-picture), a uni-direction prediction picture type (P-picture), and a bi-prediction type picture type (B-picture)). Storage circuit 218 may determine, based on the picture type of the current picture, whether to write the current picture in dedicated chip memory 230 or non-dedicated system memory 240. Storage circuit 218 may write the current picture in dedicated chip memory 230 or non-dedicated system memory 240 based on the determination of whether to write the current picture in the dedicated chip memory 230 or the non-dedicated system memory 240.

As one example, storage circuit 218 may determine to write the current picture in dedicated chip memory 230 based on the current picture being an I-picture. As another example, the picture type of the current picture may be a first picture type. Storage circuit 218 may determine a second picture type of a cached picture stored in the dedicated chip memory 230. Storage circuit 218 may compare a first priority level associated with the first picture type to a second priority level associated with the second picture type.

For instance, the priority level hierarchy may be as follows: I-picture>P-picture>B-picture. As an example, the first priority level is indicative of a higher priority than the second priority level based on the first picture type being an intra-prediction picture type (e.g., current picture is an I-picture) and the second picture type being a uni-direction prediction type (e.g., cached picture is a P-picture). The first priority level is indicative of a higher priority than the second priority level based on the first picture type being the intra-prediction picture type (e.g., current picture is an I-picture) and the second picture type being a bi-direction prediction type (e.g., cached picture is a B-picture). The first priority level is indicative of a higher priority than the second priority level based on the first picture type being the uni-direction prediction picture type (e.g., current picture is a P-picture) and the second picture type being the bi-direction prediction type (e.g., cached picture is a B-picture).

Storage circuit 218 may determine whether to write the current picture in the dedicated chip memory 230 or the non-dedicated system memory 240 based on the comparison of the first priority level to the second priority level. For example, if the first priority level is indicative of a higher priority level than the second priority level. storage circuit 218 may determine to write and write the current picture in dedicated chip memory 230. If the first priority level is indicative of a lower priority level than the second priority level, storage circuit 218 may determine to write and write the current picture in non-dedicated system memory 240.

However, another heuristic may add some constraints. For instance, if the cached picture in dedicated chip memory 230 is being used by motion compensation unit 224 for encoding the current picture, then storage circuit 218 may not write the current picture to dedicated chip memory 230. As another example, if the cached picture is going to be used as a reference picture, storage circuit 218 may determine not to write the current picture in dedicated chip memory 230, and instead determine to write the current picture in non-dedicated system memory 240.

In some example, storage circuit 218 may determine that a cached picture stored in the dedicated chip memory 230 is not going to be used as a reference picture (e.g., the cached picture is expired). Storage circuit 218 may determine to write the current picture in the dedicated chip memory 230 based on the determination that the cached picture is not going to be used as the reference picture. However, in some examples, storage circuit 218 may determine to write the current picture in dedicated chip memory 230 only if the current picture is going to be used as a reference picture. For instance, storage circuit 218 may determine that the current picture is going to be used as the reference picture. In this example, storage circuit 218 may determine to write the current picture in the dedicated chip memory 230 based on the determination that the cached picture is not going to be used as the reference picture and the current picture is going to be used as the reference picture. Otherwise, storage circuit 218 may determine to write and write the current picture to non-dedicated system memory 240.

In one or more examples, storage circuit 218 may write the current picture to dedicated chip memory 230 or non-dedicated system memory 240 as part of a reconstruction loop for video encoding. For instance, the reconstruction loop includes inverse quantization unit 210, inverse transform processing unit 212, reconstruction unit 214, and filter unit 216. As the current picture is being reconstructed through the reconstruction loop for video encoding, storage circuit 218 write the current picture to dedicated chip memory 230 or non-dedicated system memory 240.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 3:
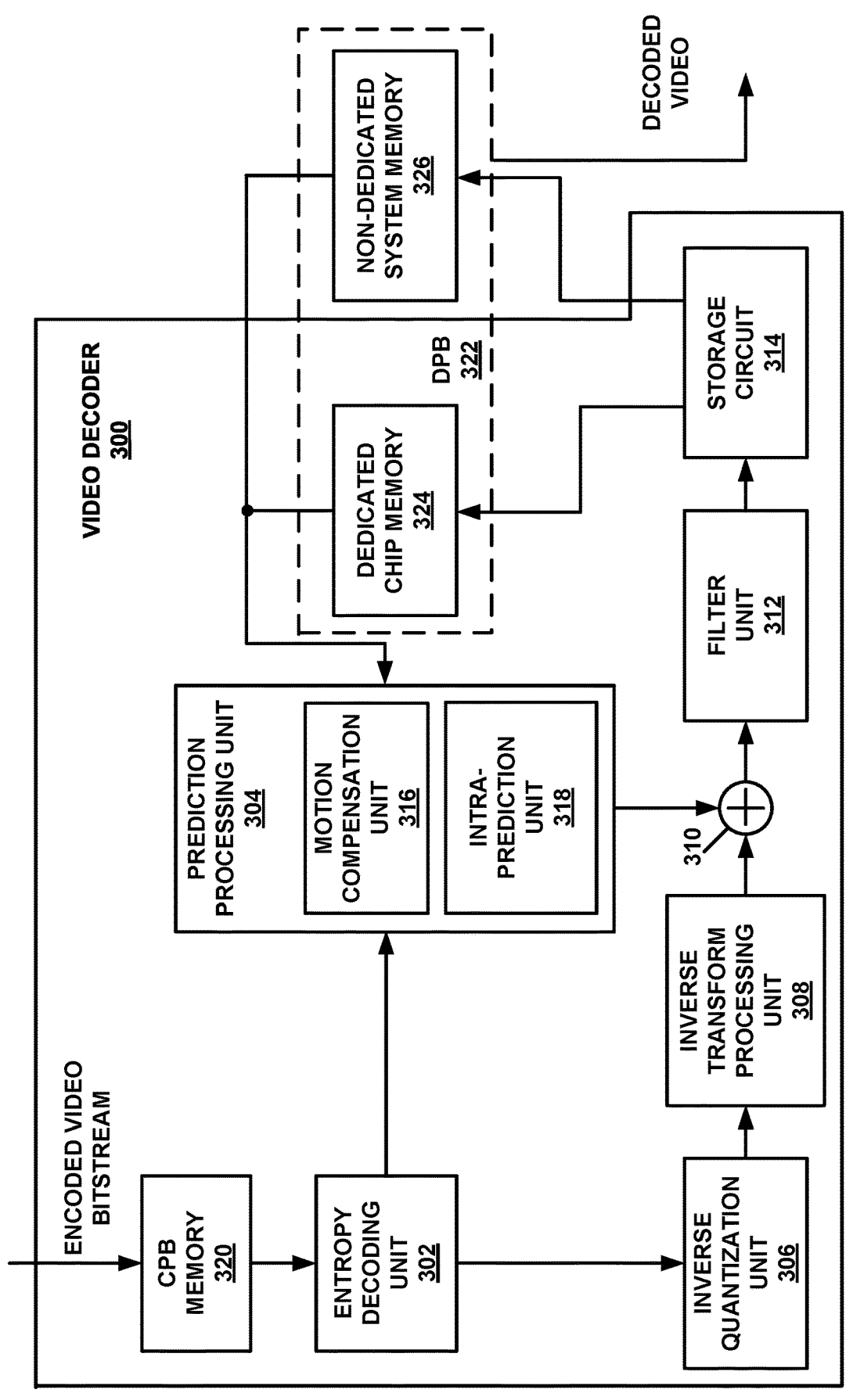
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, storage circuit 314, and DPB 322. Any or all of CPB memory 320, entropy decoding unit 302, prediction processing unit 304, inverse quantization unit 306, inverse transform processing unit 308, reconstruction unit 310, filter unit 312, storage circuit 314, and DPB 322 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

In the example of FIG. 3, DPB 322 includes dedicated chip memory 324 and non-dedicated system memory 326. In some examples, dedicated chip memory 324, such as cache memory, may be internal to the integrated circuit (IC) chip that includes video decoder 300. Non-dedicated system memory 326 may be external to the IC chip, and may be shared by components other than those of the IC chip that includes video decoder 300. As described in more detail, DPB 322 stores pictures that can be used as reference pictures. In accordance with one or more example, storage circuit 314 may determine whether to write a current picture being decoded to dedicated chip memory 324 or non-dedicated system memory 326 based on one or more heuristics such as picture types of the current picture and/or cached picture (e.g., picture stored in dedicated chip memory 324), whether the cached picture is or is going to be used as a reference picture (e.g., used for inter-prediction), etc. Storage circuit 314 may determine whether to write a current picture being decoded to dedicated chip memory 324 or non-dedicated system memory 326 prior to decoding the current picture, during the decoding of the current picture, or after decoding the current picture.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 322 generally stores decoded pictures, which video decoder 300 may output and/or use as reference video data when decoding subsequent data or pictures of the encoded video bitstream. CPB memory 320 and non-dedicated system memory 326 of DPB 322 may be formed by any of a variety of memory devices, such as DRAM, including SDRAM, MRAM, RRAM, or other types of memory devices. Dedicated chip memory 324 may be formed as cache memory (e.g., L1 or L2 cache, or last-level cache). In various examples, DPB 322, at least partially, may be on-chip with other components of video decoder 300, as illustrated, or, at least partially, off-chip relative to those components, as illustrated.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 322 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 322.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 322. For instance, in examples where operations of filter unit 312 are not performed, reconstruction unit 310 may store reconstructed blocks to DPB 322. In examples where operations of filter unit 312 are performed, filter unit 312 may store the filtered reconstructed blocks to DPB 322. As discussed above, DPB 322 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 322 for subsequent presentation on a display device, such as display device 118 of FIG. 1.

In one or more examples described in this disclosure, storage circuit 314 may determine whether reconstructed blocks of the current picture are to be stored in dedicated chip memory 324 or non-dedicated system memory 326 based on one or more heuristics. For instance, prediction processing unit 304 may be configured to determine a picture type of the current picture (e.g., comprises one of an intra-prediction picture type (I-picture), a uni-direction prediction picture type (P-picture), and a bi-prediction type picture type (B-picture)). Storage circuit 314 may determine, based on the picture type of the current picture, whether to write the current picture in dedicated chip memory 324 or non-dedicated system memory 326. Storage circuit 314 may write the current picture in dedicated chip memory 324 or non-dedicated system memory 326 based on the determination of whether to write the current picture in the dedicated chip memory 324 or the non-dedicated system memory 326.

As one example, storage circuit 314 may determine to write the current picture in dedicated chip memory 324 based on the current picture being an I-picture. As another example, the picture type of the current picture may be a first picture type. Storage circuit 314 may determine a second picture type of a cached picture stored in the dedicated chip memory 324. Storage circuit 314 may compare a first priority level associated with the first picture type to a second priority level associated with the second picture type.

For instance, the priority level hierarchy may be as follows: I-picture>P-picture>B-picture. As an example, the first priority level is indicative of a higher priority than the second priority level based on the first picture type being an intra-prediction picture type (e.g., current picture is an I-picture) and the second picture type being a uni-direction prediction type (e.g., cached picture is a P-picture). The first priority level is indicative of a higher priority than the second priority level based on the first picture type being the intra-prediction picture type (e.g., current picture is an I-picture) and the second picture type being a bi-direction prediction type (e.g., cached picture is a B-picture). The first priority level is indicative of a higher priority than the second priority level based on the first picture type being the uni-direction prediction picture type (e.g., current picture is a P-picture) and the second picture type being the bi-direction prediction type (e.g., cached picture is a B-picture).

Storage circuit 314 may determine whether to write the current picture in the dedicated chip memory 324 or the non-dedicated system memory 326 based on the comparison of the first priority level to the second priority level. For example, if the first priority level is indicative of a higher priority level than the second priority level, storage circuit 314 may determine to write and write the current picture in dedicated chip memory 324. If the first priority level is indicative of a lower priority level than the second priority level, storage circuit 314 may determine to write and write the current picture in non-dedicated system memory 326.

However, another heuristic may add some constraints. For instance, if the cached picture in dedicated chip memory 324 is being used by motion compensation unit 316 for decoding the current picture, then storage circuit 314 may not write the current picture to dedicated chip memory 324. As another example, if the cached picture is going to be used as a reference picture, storage circuit 314 may determine not to write the current picture in dedicated chip memory 324, and instead determine to write the current picture in non-dedicated system memory 326.

In some example, storage circuit 314 may determine that a cached picture stored in the dedicated chip memory 324 is not going to be used as a reference picture (e.g., the cached picture is expired). Storage circuit 314 may determine to write the current picture in the dedicated chip memory 324 based on the determination that the cached picture is not going to be used as the reference picture. However, in some examples, storage circuit 314 may determine to write the current picture in dedicated chip memory 324 only if the current picture is going to be used as a reference picture. For instance, storage circuit 314 may determine that the current picture is going to be used as the reference picture. In this example, storage circuit 314 may determine to write the current picture in the dedicated chip memory 324 based on the determination that the cached picture is not going to be used as the reference picture and the current picture is going to be used as the reference picture. Otherwise, storage circuit 314 may determine to write and write the current picture to non-dedicated system memory 326.

Storage circuit 314 may determine whether the current picture is going to be used as a reference picture (e.g., for inter-prediction) using any of example techniques described above. For instance, storage circuit 314 may use buffered information from the bitstream stored in CPB memory 320 regarding motion vectors and/or reference picture sets of future pictures (e.g., picture that are decoded after the current picture) to determine if the current picture is used as a reference. As another example, storage circuit 314 may use the repetitiveness in sets of pictures (e.g., GOPs) where the structure profile of a previous set of pictures is the same a current set of pictures that includes the current picture. If a first picture in the previous set of pictures used a second picture in the previous set of pictures, where the second picture is associated with the current picture in the current set of pictures, then there is a high likelihood that the current picture will be used as a reference picture for one of the pictures in the current set of pictures.

In some examples, storage circuit 314 may determine whether the cached picture stored in dedicated chip memory 324 is expired (e.g., no longer used as a reference picture). Storage circuit 314 may use the above techniques and/or techniques defined by video coding standards to determine whether the cached picture stored in dedicated chip memory 324 is expired.

Figure 4:
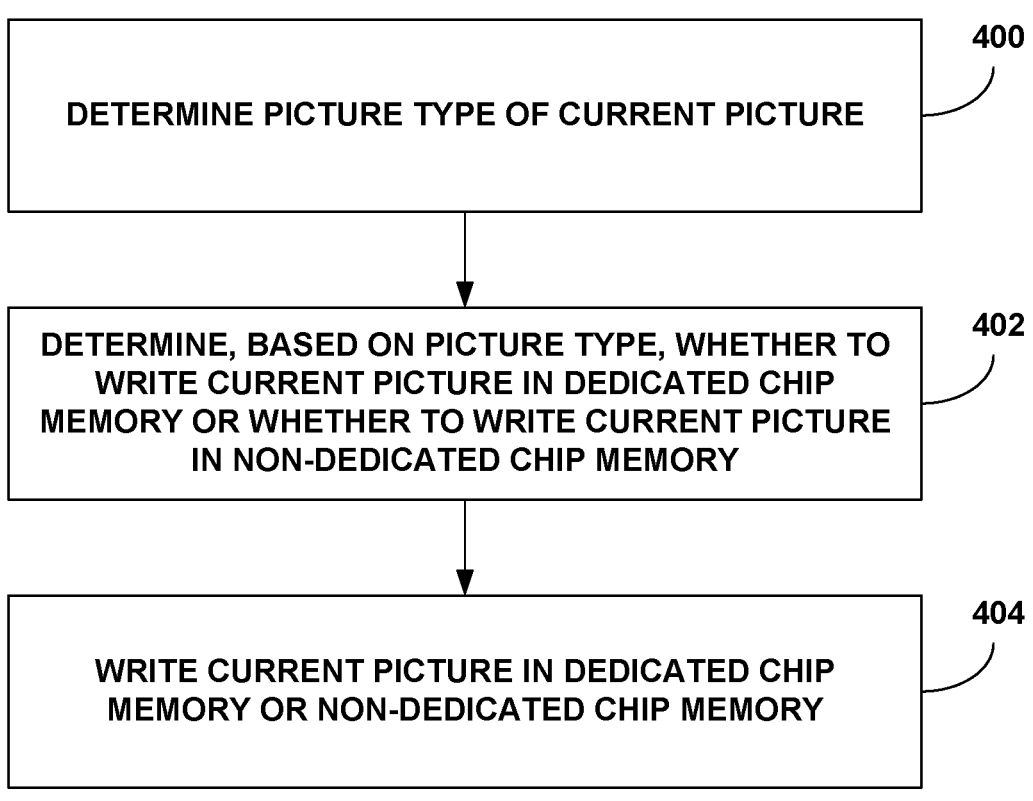
FIG. 4 is a flowchart illustrating an example method of processing video data.

FIG. 4 is a flowchart illustrating an example method of processing video data. For ease, the example of FIG. 4 is described with respect to processing circuitry and dedicated chip memory and non-dedicated system memory. Examples of the processing circuitry include video encoder 200 and video decoder 300. Examples of the dedicated chip memory includes dedicated chip memory 230 (FIG. 2) or 324 (FIG. 3), and examples of the non-dedicated system memory includes non-dedicated system memory 240 (FIG. 2) or 326 (FIG. 3).

The processing circuitry may determine a picture type of a current picture (400). For example, the picture type may be one of an intra-prediction picture type, a uni-direction prediction picture type, and a bi-prediction type picture type.

The processing circuitry may determine, based on the picture type of the current picture, whether to write the current picture in the dedicated chip memory or whether to write the current picture in the non-dedicated system memory (402). As one example, if the current picture is an I-picture, the processing circuitry may determine to write the current picture to the dedicated chip memory. As another example, assume that the picture type of the current picture is a first picture type. The processing circuitry may determine a second picture type of a cached picture stored in the dedicated chip memory, and compare a first priority level associated with the first picture type to a second priority level associated with the second picture type.

In this example, the processing circuitry may determine whether to write the current picture in the dedicated chip memory or the non-dedicated system memory based on the comparison of the first priority level to the second priority level. For example, if the first priority level associated with the first picture type of the current picture has a higher priority than the second priority level associated with the second picture type of the cached picture, the processing circuitry may determine to write the current picture to the dedicated chip memory. Otherwise, the processing circuitry may determine to write the current picture to non-dedicated system memory.

The processing circuitry may write the current picture in the dedicated chip memory or the non-dedicated system memory based on the determination of whether to write the current picture in the dedicated chip memory or whether to write the current picture in the non-dedicated system memory (404). For example, the processing circuitry may reconstruct the current picture, and write the current picture during the reconstruction of the current picture. For instance, storage circuit 314 may write the current picture as the current picture is being reconstructed by reconstruction unit 310. In some examples, the processing circuitry may write the current picture during the reconstruction of the current picture as part of a reconstruction loop for video encoding. For instance, storage circuit 218 may write the current picture as part of the reconstruction loop for video encoding.

FIG. 5 is a flowchart illustrating another example method of processing video data. For ease of illustration, FIG. 5 refers to a second picture. For instance, the current picture of FIG. 4 may be considered as a first picture, and the example of FIG. 5 is described with respect to a second picture. In one or more examples, video encoder 200 and video decoder 300 may configured to perform the example techniques of FIG. 4, but not those of FIG. 5, or perform the example techniques of FIG. 4, but not those of FIG. 5. In some examples, video encoder 200 and video decoder 300 may be configured to perform the example techniques of FIGS. 4 and 5. That is, for one picture (e.g., first picture) based on the applicable heuristics, video encoder 200 and video decoder 300 may perform the example techniques of FIG. 4. For another picture (e.g., second picture) based on the applicable heuristics, video encoder 200 and video decoder 300 may perform the example techniques of FIG. 5.

For ease, the example of FIG. 4 is described with respect to processing circuitry and dedicated chip memory and non-dedicated system memory. Examples of the processing circuitry include video encoder 200 and video decoder 300. Examples of the dedicated chip memory includes dedicated chip memory 230 (FIG. 2) or 324 (FIG. 3), and examples of the non-dedicated system memory includes non-dedicated system memory 240 (FIG. 2) or 326 (FIG. 3).

The processing circuitry may determine whether a cached picture stored in the dedicated chip memory is going to be used as a reference picture or is being used as a reference picture of a second picture (500). If the processing circuitry determines that the cached picture is going to be used as a reference picture or is being used a reference picture for the second picture (YES of 500), the processing circuitry may keep the cached picture in the dedicated chip memory (506). In some examples, the processing circuitry may keep the cached picture in dedicated chip memory assuming that the second picture is not an I-picture.

If the processing circuitry determines that the cached picture is not going to be used as a reference picture or is not being used a reference picture for the second picture (NO of 500), the processing circuitry may determine whether the second picture is going to be used as a reference picture (502). If the processing circuitry determines that the second picture is going to be used as reference picture (YES of 502), the processing circuitry may determine to write and write the second picture in dedicated chip memory (504).

Stated another way, the processing circuitry may determine that a cached picture stored in the dedicated chip memory is not going to be used as a reference picture (NO of 500), and determine to write a second picture in the dedicated chip memory based on the determination that the cached picture is not going to be used as the reference picture (508). However, in some examples, the processing circuitry may also determine that the second picture is going to be used as the reference picture (YES of 502), and determine to write the second picture in the dedicated chip memory based on the determination that the cached picture is not going to be used as the reference picture (NO of 500) and the second picture is going to be used as the reference picture (YES of 502).

If the processing circuitry determines that the second picture is not going to be used as a reference picture (NO of 502), the processing circuitry may write the second picture in the non-dedicated system memory (508). In some examples, the processing circuitry may flush the cached picture from the dedicated chip memory or keep the cached picture in the dedicated chip memory (510). For instance, if the cached picture is not going to be used as a reference picture (NO of 500) and the second picture is not going to be used as a reference picture (NO of 502), there may be little to no benefit of keeping the cached picture in the dedicated chip memory and similarly little to no benefit in writing the second picture to the dedicated chip memory. Therefore, the processing circuitry may flush the cached picture from the dedicated chip memory so that the dedicated chip memory is ready for being written to. However, such flushing of the dedicated chip memory is optional, and it may be possible to keep the cached picture in the dedicated chip memory.

The examples of FIGS. 4 and 5 may be represented as the following pseudocode. The pseudocode is described from perspective of video decoding, but may be appliable to video encoding perspective as well. Cache in the pseudocode is an example of dedicated chip memory 230 or 324.

```
foreach decoded picture
    if decoded picture is used as reference
        if cache is full
            if a picture in cache has expired
                replace expired picture with decoded picture
            else if decoded picture has higher priority than oldest picture in
            cache
                replace oldest picture with decoded picture
        else
            cache decoded picture
```

Figures 6A, 6B:
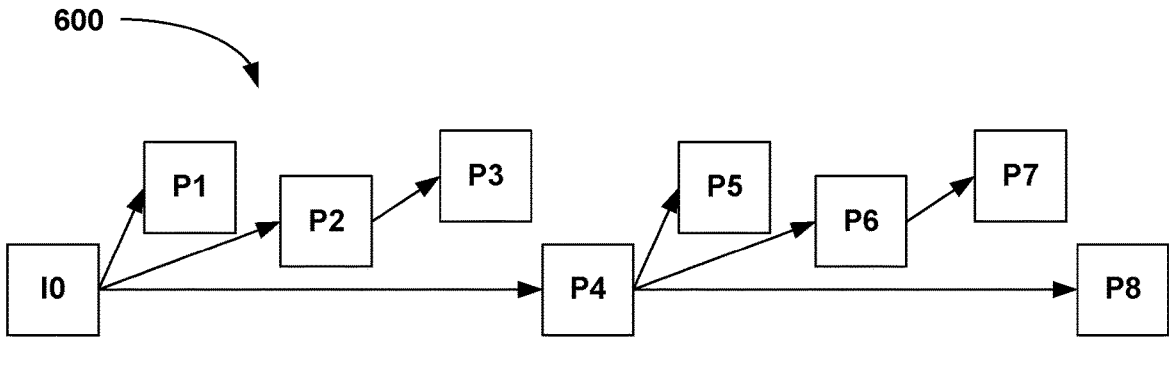
FIGS. 6A and 6B are conceptual diagrams illustrating an example of a coding structure and reading and writing from dedicated chip memory.
Figure 7A:
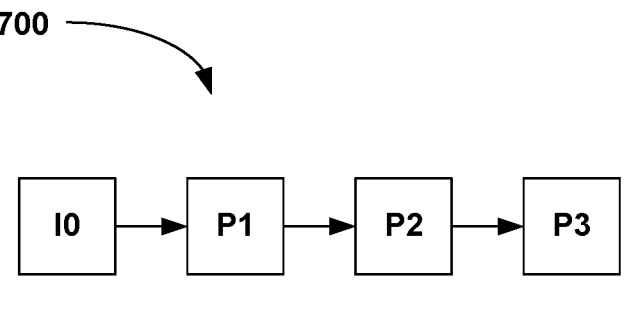
FIGS. 7A and 7B are conceptual diagrams illustrating another example of a coding structure and reading and writing from dedicated chip memory.
Figure 7B:
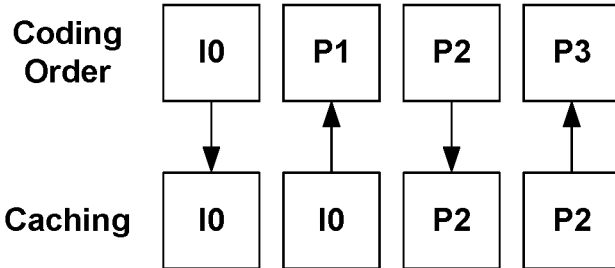
Figure 8A:
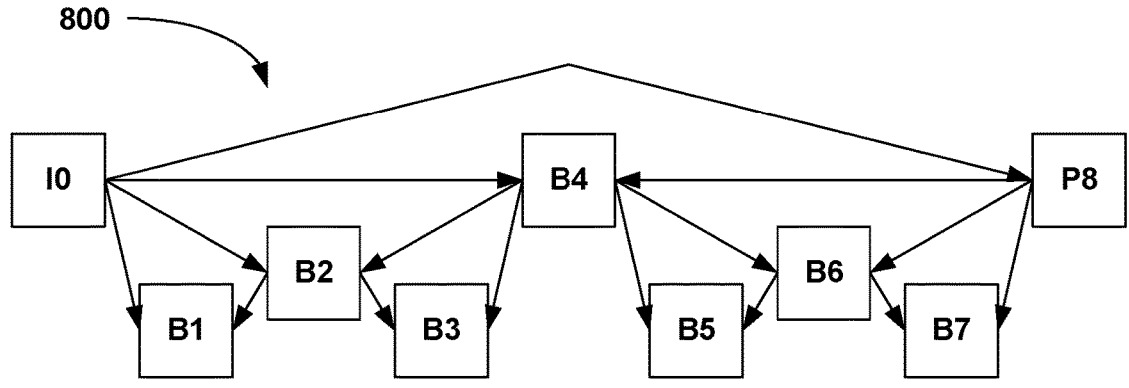
FIGS. 8A and 8B are conceptual diagrams illustrating another example of a coding structure and reading and writing from dedicated chip memory.
Figure 8B:
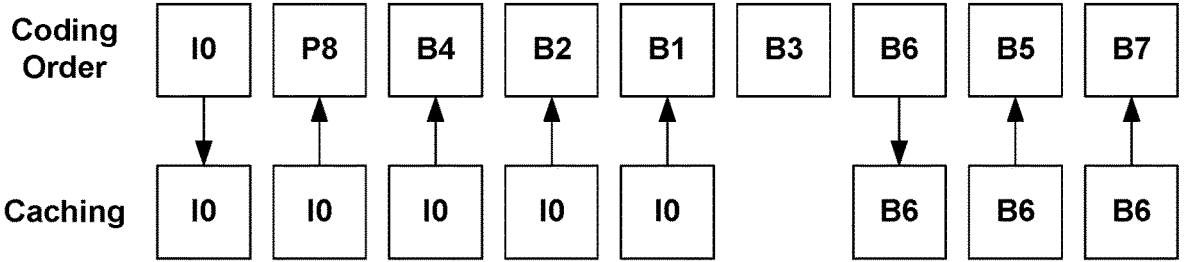

FIGS. 6A and 6B are conceptual diagrams illustrating an example of a coding structure and reading and writing from dedicated chip memory. FIGS. 7A and 7B are conceptual diagrams illustrating another example of a coding structure and reading and writing from dedicated chip memory. FIGS. 8A and 8B are conceptual diagrams illustrating another example of a coding structure and reading and writing from dedicated chip memory. The examples of FIGS. 6A-8B are to provide illustration of the example techniques with respect to different coding structures. In FIGS. 6A, 7A, and 8A, the arrows extending from a picture to another pictures indicates that the picture from which the arrow extends is used as a reference picture by the picture to which the arrow points.

FIG. 6A illustrates coding structure 600, which may be a set of pictures such as a GOP. Coding structure 600 includes one I-picture (I0), and eight P-pictures (P1-P8). As illustrated, pictures P1, P2, and P4 use picture I0 as a reference picture, picture P3 uses picture P2 as a reference picture, pictures P5, P6, and P8 use picture P4 as a reference picture, and picture P7 uses picture P6 as a reference picture. Video encoder 200 and video decoder 300 may determine coding structure 600 using the example techniques described above.

FIG. 6B illustrates the coding order of coding structure 600. For example, picture I0 is coded (e.g., encoded or decoded) first, followed by picture P1, then picture P2, and so forth. FIG. 6B also illustrates which picture is being written to or read from dedicated chip memory 230 or 324.

For example, as shown in FIG. 6B with the down arrow, as video encoder 200 encodes or video decoder 300 decodes picture I0, video encoder 200 writes picture I0 (e.g., as part of reconstruction loop) to dedicated chip memory 230, or video decoder 300 writes I0 to dedicated chip memory 324. The next picture in coding order is picture P1. Because picture P1 uses picture I0 as a reference picture, video encoder 200 may encode picture P1 by reading picture I0 from dedicated chip memory 230, and video decoder 300 may decode picture P1 by reading picture I0 from dedicated chip memory 324.

In the example of FIG. 6B, video encoder 200 and video decoder 300 may not write picture P1 to dedicated chip memory 230 or 324 based on one or more of the heuristics. For instance, picture P1 is not used as a reference picture, and therefore, video encoder 200 and video decoder 300 may determine not to write picture P1 to dedicated chip memory 230 or 324. As another example, the priority level of picture P1 (e.g., P-picture) is less than the priority level of picture I0 (e.g., I-picture), and picture I0 is going to used again as a reference picture. Therefore, video encoder 200 and video decoder 300 may determine not to write picture P1 to dedicated chip memory 230 or 324. As another example, encoding and decoding of picture P1 utilizes picture I0, and if picture P1 were written to dedicated chip memory 230 or 324, there is a chance of overwriting portions of picture I0 needed for coding picture P1. Therefore, video encoder 200 and video decoder 300 may determine not to write picture P1 to dedicated chip memory 230 or 324. In this example, picture P1 may be written to non-dedicated system memory 240 or 326.

The next picture in coding order is picture P2. Because picture P2 uses picture IO as a reference picture, video encoder 200 may encode picture P2 by reading picture 10 from dedicated chip memory 230, and video decoder 300 may decode picture P2 by reading picture I0 from dedicated chip memory 324.

In the example of FIG. 6B, video encoder 200 and video decoder 300 may not write picture P2 to dedicated chip memory 230 or 324 based on one or more of the heuristics. For instance, picture P2 is used as a reference picture (e.g., for picture P3); however, the priority level of picture P2 (e.g., P-picture) is less than the priority level of picture I0 (e.g., I-picture), and picture I0 is going to used again as a reference picture. Therefore, video encoder 200 and video decoder 300 may determine not to write picture P2 to dedicated chip memory 230 or 324. As another example, encoding and decoding of picture P2 utilizes picture I0, and if picture P2 were written to dedicated chip memory 230 or 324, there is a chance of overwriting portions of picture I0 needed for coding picture P2. Therefore, video encoder 200 and video decoder 300 may determine not to write picture P2 to dedicated chip memory 230 or 324. In this example, picture P2 may be written to non-dedicated system memory 240 or 326.

The next picture in coding order is picture P3. Because picture P3 uses picture P2 as a reference picture, video encoder 200 may encode picture P3 by reading picture P2 from non-dedicated system memory 240, and video decoder 300 may decode picture P3 by reading picture P2 from non-dedicated system memory 326. For instance, in FIG. 6B there is no up arrow from I0 to P3. Picture I0 may remain in dedicated chip memory 230 or 324.

In the example of FIG. 6B, video encoder 200 and video decoder 300 may not write picture P3 to dedicated chip memory 230 or 324 based on one or more of the heuristics. For instance, picture P3 is not used as a reference picture, and therefore, video encoder 200 and video decoder 300 may determine not to write picture P3 to dedicated chip memory 230 or 324. As another example, the priority level of picture P3 (e.g., P-picture) is less than the priority level of picture I0 (e.g., I-picture), and picture I0 is going to used again as a reference picture. Therefore, video encoder 200 and video decoder 300 may determine not to write picture P3 to dedicated chip memory 230 or 324. In this example, picture P3 may be written to non-dedicated system memory 240 or 326.

The next picture in coding order is picture P4. Because picture P4 uses picture I0 as a reference picture, video encoder 200 may encode picture P4 by reading picture I0 from dedicated chip memory 230, and video decoder 300 may decode picture P4 by reading picture I0 from dedicated chip memory 324.

In the example of FIG. 6B, video encoder 200 and video decoder 300 may not write picture P4 to dedicated chip memory 230 or 324 based on one or more of the heuristics. For instance, although picture P4 is used as a reference picture and picture I0 is no longer used as a reference picture after coding of picture P4, the encoding and decoding of picture P4 utilizes picture I0, and if picture P4 were written to dedicated chip memory 230 or 324, there is a chance of overwriting portions of picture I0 needed for coding picture P4. Therefore, video encoder 200 and video decoder 300 may determine not to write picture P4 to dedicated chip memory 230 or 324.

In this example, picture P4 may be written to non-dedicated system memory 240 or 326. However, because picture P4 is going to be a reference picture for other pictures and picture I0 is expired (e.g., no longer used as a reference picture), during a subsequent read of picture P4 for non-dedicated system memory 240 or 326, video encoder 200 and video decoder 300 may write picture P4 into dedicated chip memory 230 or 324. This is illustrated in FIG. 6B by the change of the caching of I0 to P4.

The next picture in coding order is picture P5. Because picture P5 uses picture P4 as a reference picture, video encoder 200 may encode picture P5 by reading picture P4 from dedicated chip memory 230, and video decoder 300 may decode picture P5 by reading picture P4 from dedicated chip memory 324.

In the example of FIG. 6B, video encoder 200 and video decoder 300 may not write picture P5 to dedicated chip memory 230 or 324 based on one or more of the heuristics. For instance, picture P5 is not used as a reference picture, and therefore, video encoder 200 and video decoder 300 may determine not to write picture P5 to dedicated chip memory 230 or 324. As another example, encoding and decoding of picture P5 utilizes picture P4, and if picture P5 were written to dedicated chip memory 230 or 324, there is a chance of overwriting portions of picture P4 needed for coding picture P5. Therefore, video encoder 200 and video decoder 300 may determine not to write picture P5 to dedicated chip memory 230 or 324. In this example, picture P5 may be written to non-dedicated system memory 240 or 326.

The next picture in coding order is picture P6. Because picture P6 uses picture P4 as a reference picture, video encoder 200 may encode picture P6 by reading picture P4 from dedicated chip memory 230, and video decoder 300 may decode picture P6 by reading picture I0 from dedicated chip memory 324.

In the example of FIG. 6B, video encoder 200 and video decoder 300 may not write picture P6 to dedicated chip memory 230 or 324 based on one or more of the heuristics. For instance, picture P6 is used as a reference picture (e.g., for picture P7); however, picture P4 is going to used again as a reference picture. Therefore, video encoder 200 and video decoder 300 may determine not to write picture P6 to dedicated chip memory 230 or 324. As another example, encoding and decoding of picture P6 utilizes picture P4, and if picture P6 were written to dedicated chip memory 230 or 324, there is a chance of overwriting portions of picture P4 needed for coding picture P6.

Therefore, video encoder 200 and video decoder 300 may determine not to write picture P6 to dedicated chip memory 230 or 324. In this example, picture P6 may be written to non-dedicated system memory 240 or 326.

The next picture in coding order is picture P7. Because picture P7 uses picture P6 as a reference picture, video encoder 200 may encode picture P7 by reading picture P6 from non-dedicated system memory 240, and video decoder 300 may decode picture P7 by reading picture P6 from non-dedicated system memory 326. For instance, in FIG. 6B there is no up arrow from P4 to P7. Picture P4 may remain in dedicated chip memory 230 or 324.

In the example of FIG. 6B, video encoder 200 and video decoder 300 may not write picture P7 to dedicated chip memory 230 or 324 based on one or more of the heuristics. For instance, picture P7 is not used as a reference picture, and therefore, video encoder 200 and video decoder 300 may determine not to write picture P7 to dedicated chip memory 230 or 324. Therefore, video encoder 200 and video decoder 300 may determine not to write picture P7 to dedicated chip memory 230 or 324. In this example, picture P7 may be written to non-dedicated system memory 240 or 326.

The next picture in coding order is picture P8. Because picture P8 uses picture P4 as a reference picture, video encoder 200 may encode picture P8 by reading picture P4 from dedicated chip memory 230, and video decoder 300 may decode picture P8 by reading picture I0 from dedicated chip memory 324. This completes the coding of coding structure 600. In the example of FIGS. 6A and 6B, because some pictures can be read from dedicated chip memory 230 or 324 instead of always reading from non-dedicated system memory 240 or 326, there may be a bandwidth saving of 46% (e.g., reduction in 46% of number of times a read needs to happen from non-dedicated system memory 240 or 326).

FIG. 7A illustrates coding structure 700, which may be a set of pictures such as a GOP. Coding structure 700 includes one I-picture (I0), and three P-pictures (P1-P3). As illustrated, picture P1 uses picture I0 as a reference picture, picture P2 uses picture P1 as a reference picture, and picture P3 uses picture P2 as a reference picture. Video encoder 200 and video decoder 300 may determine coding structure 700 using the example techniques described above.

FIG. 7B illustrates the coding order of coding structure 600. For example, picture I0 is coded (e.g., encoded or decoded) first, followed by picture P1, then picture P2, and so forth. FIG. 7B also illustrates which picture is being written to or read from dedicated chip memory 230 or 324.

For example, as shown in FIG. 7B with the down arrow, as video encoder 200 encodes or video decoder 300 decodes picture I0, video encoder 200 writes picture I0 (e.g., as part of reconstruction loop) to dedicated chip memory 230, or video decoder 300 writes I0 to dedicated chip memory 324. The next picture in coding order is picture P1. Because picture P1 uses picture I0 as a reference picture, video encoder 200 may encode picture P1 by reading picture I0 from dedicated chip memory 230, and video decoder 300 may decode picture P1 by reading picture I0 from dedicated chip memory 324.

In the example of FIG. 7B, video encoder 200 and video decoder 300 may not write picture P1 to dedicated chip memory 230 or 324 based on one or more of the heuristics. For instance, picture P1 is used as a reference picture (e.g., for picture P2) and picture I0 is no longer used as a reference picture; however, encoding and decoding of picture P1 utilizes picture I0, and if picture P1 were written to dedicated chip memory 230 or 324, there is a chance of overwriting portions of picture I0 needed for coding picture P1. Therefore, video encoder 200 and video decoder 300 may determine not to write picture P1 to dedicated chip memory 230 or 324. In this example, picture P1 may be written to non-dedicated system memory 240 or 326.

The next picture in coding order is picture P2. In this example, unlike FIGS. 6A and 6B, video encoder 200 and video decoder 300 may not access picture P1 from non-dedicated system memory 240 or 326 for writing to dedicated chip memory 230 or 324 because picture P1 is no longer used as a reference picture. Instead, as shown in FIG. 7B, as video encoder 200 encodes or video decoder 300 decodes picture P2, video encoder 200 writes picture P2 (e.g., as part of reconstruction loop) to dedicated chip memory 230, or video decoder 300 writes P2 to dedicated chip memory 324. This is shown in FIG. 7B with the down arrow from P2.

The next picture in coding order is picture P3. Because picture P3 uses picture P2 as a reference picture, video encoder 200 may encode picture P3 by reading picture P2 from dedicated chip memory 230, and video decoder 300 may decode picture P3 by reading picture P2 from dedicated chip memory 324. This completes the coding of coding structure 700. In the example of FIGS. 7A and 7B, because some pictures can be read from dedicated chip memory 230 or 324 instead of always reading from non-dedicated system memory 240 or 326, there may be a bandwidth saving of 57% (e.g., reduction in 57% of number of times a read needs to happen from non-dedicated system memory 240 or 326).

FIG. 8A illustrates coding structure 800, which may be a set of pictures such as a GOP. Coding structure 800 includes one I-picture (I0), one P-picture (P8), and seven B-pictures (B1-B7). As illustrated, pictures P8, B1, B2, and B4 use picture I0 as a reference picture, picture B1 also uses picture B2 as a reference picture, picture B2 also uses picture B4 as a reference picture, and picture B4 also uses picture P8 as a reference picture. Picture B3 uses pictures B2 and B4 as reference pictures. Pictures B5 and B6 use picture B4 is a reference picture, picture B5 also uses picture B6 as a reference picture, and picture B6 also uses picture P8 as a reference picture. Picture B7 uses pictures P8 and B6 as reference pictures. Video encoder 200 and video decoder 300 may determine coding structure 800 using the example techniques described above.

FIG. 8B illustrates the coding order of coding structure 800. For example, picture I0 is coded (e.g., encoded or decoded) first, followed by picture P8, then picture P4, then picture B2, then picture B1, then picture B3, then picture B6, then picture B5, and then picture B7. FIG. 8B also illustrates which picture is being written to or read from dedicated chip memory 230 or 324.

For example, as shown in FIG. 8B with the down arrow, as video encoder 200 encodes or video decoder 300 decodes picture I0, video encoder 200 writes picture I0 (e.g., as part of reconstruction loop) to dedicated chip memory 230, or video decoder 300 writes I0 to dedicated chip memory 324. The next picture in coding order is picture P8. Because picture P8 uses picture I0 as a reference picture, video encoder 200 may encode picture P8 by reading picture I0 from dedicated chip memory 230, and video decoder 300 may decode picture P8 by reading picture I0 from dedicated chip memory 324.

In the example of FIG. 8B, video encoder 200 and video decoder 300 may not write picture P8 to dedicated chip memory 230 or 324 based on one or more of the heuristics. For instance, picture P8 is used as a reference picture, but the priority level of picture P8 (e.g., P-picture) is less than the priority level of picture I0 (e.g., I-picture), and picture I0 is going to used again as a reference picture. Therefore, video encoder 200 and video decoder 300 may determine not to write picture P8 to dedicated chip memory 230 or 324. As another example, encoding and decoding of picture P8 utilizes picture I0, and if picture P8 were written to dedicated chip memory 230 or 324, there is a chance of overwriting portions of picture I0 needed for coding picture P8. Therefore, video encoder 200 and video decoder 300 may determine not to write picture P8 to dedicated chip memory 230 or 324. In this example, picture P8 may be written to non-dedicated system memory 240 or 326.

The next picture in coding order is picture B4. Because picture B4 uses picture I0 as a reference picture, video encoder 200 may encode picture B4 by reading picture I0 from dedicated chip memory 230, and video decoder 300 may decode picture B4 by reading picture I0 from dedicated chip memory 324. Also, picture B4 uses picture P8 as a reference picture, and reads picture P8 from non-dedicated system memory 240 or 326 if dedicated chip memory 230 or 324 can only store one picture.

In the example of FIG. 8B, video encoder 200 and video decoder 300 may not write picture B4 to dedicated chip memory 230 or 324 based on one or more of the heuristics. For instance, picture B4 is used as a reference picture, but the priority level of picture B4 (e.g., P-picture) is less than the priority level of picture I0 (e.g., I-picture), and picture I0 is going to used again as a reference picture. Therefore, video encoder 200 and video decoder 300 may determine not to write picture B4 to dedicated chip memory 230 or 324. As another example, encoding and decoding of picture B4 utilizes picture I0, and if picture B4 were written to dedicated chip memory 230 or 324, there is a chance of overwriting portions of picture I0 needed for coding picture B4. Therefore, video encoder 200 and video decoder 300 may determine not to write picture B4 to dedicated chip memory 230 or 324. In this example, picture B4 may be written to non-dedicated system memory 240 or 326.

The next picture in coding order is picture B2. Because picture B2 uses picture I0 as a reference picture, video encoder 200 may encode picture B2 by reading picture I0 from dedicated chip memory 230, and video decoder 300 may decode picture B2 by reading picture I0 from dedicated chip memory 324. Also, picture B2 uses picture B4 as a reference picture, and reads picture B4 from non-dedicated system memory 240 or 326 if dedicated chip memory 230 or 324 can only store one picture.

In the example of FIG. 8B, video encoder 200 and video decoder 300 may not write picture B2 to dedicated chip memory 230 or 324 based on one or more of the heuristics. For instance, picture B2 is used as a reference picture, but the priority level of picture B2 (e.g., P-picture) is less than the priority level of picture I0 (e.g., I-picture), and picture I0 is going to used again as a reference picture. Therefore, video encoder 200 and video decoder 300 may determine not to write picture B2 to dedicated chip memory 230 or 324. As another example, encoding and decoding of picture B2 utilizes picture I0, and if picture B2 were written to dedicated chip memory 230 or 324, there is a chance of overwriting portions of picture I0 needed for coding picture B2. Therefore, video encoder 200 and video decoder 300 may determine not to write picture B2 to dedicated chip memory 230 or 324. In this example, picture B2 may be written to non-dedicated system memory 240 or 326.

The next picture in coding order is picture B1. Because picture B1 uses picture I0 as a reference picture, video encoder 200 may encode picture B1 by reading picture 10 from dedicated chip memory 230, and video decoder 300 may decode picture B1 by reading picture I0 from dedicated chip memory 324. Also, picture B1 uses picture B2 as a reference picture, and reads picture B2 from non-dedicated system memory 240 or 326 if dedicated chip memory 230 or 324 can only store one picture.

In the example of FIG. 8B, video encoder 200 and video decoder 300 may not write picture B1 to dedicated chip memory 230 or 324 based on one or more of the heuristics. For instance, picture B1 is not used as a reference picture. Also, although picture I0 is no longer used as a reference picture, after picture B1, encoding and decoding of picture B1 utilizes picture I0, and if picture B1 were written to dedicated chip memory 230 or 324, there is a chance of overwriting portions of picture I0 needed for coding picture B1. Therefore, video encoder 200 and video decoder 300 may determine not to write picture B1 to dedicated chip memory 230 or 324. In this example, picture B1 may be written to non-dedicated system memory 240 or 326.

The next picture in coding order is picture B3. Picture B3 uses pictures B2 and B4 as reference pictures, but neither pictures B2 nor B4 are stored in dedicated chip memory 230 or 324. Therefore, video encoder 200 and video decoder 300 may read pictures B2 and B4 from non-dedicated system memory 240 or 326. Also, because picture B3 is not used as a reference picture, video encoder 200 and video decoder 300 may not write picture B3 to dedicated chip memory 230 or 324.

However, in some examples, rather than keeping dedicated chip memory 230 or 324 empty, video encoder 200 and video decoder 300 may proactively access one of pictures B4 or P8 from non-dedicated system memory 240 or 326 for writing to dedicated chip memory 230 or 324 for encoding and decoding of picture B6. Writing one of pictures B4 or P8 to dedicated chip memory 230 or 324 may be optional, and based on bandwidth availability to non-dedicated system memory 240 or 326.

The next picture in coding order is picture B6. Picture B6 uses pictures B4 and P8 as reference pictures, but neither pictures B4 nor P8 are stored in dedicated chip memory 230 or 324. Therefore, video encoder 200 and video decoder 300 may read pictures B4 and P8 from non-dedicated system memory 240 or 326. However, if one of pictures B4 or P8 were accessed and written to dedicated chip memory 230 or 324 after or during coding of picture B3, video encoder 200 and video decoder 300 may read one of picture B4 or P8 from dedicated chip memory 230 or 324.

Video encoder 200 and video decoder 300 may write picture B6 to dedicated chip memory 230 or 324, as shown with the down arrow. For instance, because picture B6 is going to be used as a reference picture, and dedicated chip memory 230 or 324 may be empty, there may be benefit of writing picture B6 to dedicated chip memory 230 or 324.

The next picture in coding order is picture B5. Picture B5 uses pictures B4 and B6 as reference pictures. Video encoder 200 and video decoder 300 may read picture B6 from dedicated chip memory 230 or 324 for encoding or decoding picture B5, and read picture B4 from non-dedicated system memory 240 or 326 for encoding or decoding picture B5. Video encoder 200 and video decoder 300 may determine not to write picture B5 to dedicated chip memory 230 or 324 because picture B5 is not used as a reference picture, and write picture B5 to non-dedicated system memory 240 or 326.

The next picture in coding order is picture B7. Picture B7 uses pictures P8 and B6 as reference pictures. Video encoder 200 and video decoder 300 may read picture B6 from dedicated chip memory 230 or 324 for encoding or decoding picture B7, and read picture P8 from non-dedicated system memory 240 or 326 for encoding or decoding picture B7. This completes the coding of coding structure 800. In the example of FIGS. 8A and 8B, because some pictures can be read from dedicated chip memory 230 or 324 instead of always reading from non-dedicated system memory 240 or 326, there may be a bandwidth saving of 40% (e.g., reduction in 40% of number of times a read needs to happen from non-dedicated system memory 240 or 326).

The following example techniques may be used separately or in any combination.

Clause 1. A method of processing video data, the method comprising: determining a picture type of a current picture; determining, based on the picture type of the current picture, whether to write the current picture in a dedicated chip memory or whether to write the current picture a non-dedicated system memory; and writing the current picture in the dedicated chip memory or the non-dedicated system memory based on the determining of whether to write the current picture in the dedicated chip memory or whether to write the current picture in the non-dedicated system memory.

Clause 2. The method of clause 1, wherein the picture type comprises one of an intra-prediction picture type, a uni-direction prediction picture type, and a bi-prediction type picture type.

Clause 3. The method of any of clauses 1 and 2, wherein the picture type comprises a first picture type, the method further comprising: determining a second picture type of a cached picture stored in the dedicated chip memory; and comparing a first priority level associated with the first picture type to a second priority level associated with the second picture type, wherein determining whether to write the current picture in the dedicated chip memory or the non-dedicated system memory comprises determining whether to write the current picture in the dedicated chip memory or the non-dedicated system memory based on the comparing of the first priority level to the second priority level.

Clause 4. The method of clause 3, wherein one of: the first priority level is indicative of a higher priority than the second priority level based on the first picture type being an intra-prediction picture type and the second picture type being a uni-direction prediction type; the first priority level is indicative of a higher priority than the second priority level based on the first picture type being the intra-prediction picture type and the second picture type being a bi-direction prediction type; or the first priority level is indicative of a higher priority than the second priority level based on the first picture type being the uni-direction prediction picture type and the second picture type being the bi-direction prediction type.

Clause 5. The method of any of clauses 1-4, wherein the current picture is a first picture, the method further comprising: determining that a cached picture stored in the dedicated chip memory is not going to be used as a reference picture; and determining to write a second picture in the dedicated chip memory based on the determination that the cached picture is not going to be used as the reference picture.

Clause 6. The method of clause 5, further comprising: determining that the second picture is going to be used as the reference picture, wherein determining to write the second picture comprises determining to write the second picture in the dedicated chip memory based on the determination that the cached picture is not going to be used as the reference picture and the second picture is going to be used as the reference picture.

Clause 7. The method of any of clauses 1-6, further comprising: reconstructing the current picture, wherein writing the current picture comprises writing the current picture during the reconstructing of the current picture.

Clause 8. The method of clause 7, wherein writing the current picture comprises writing the current picture during the reconstructing of the current picture as part of a reconstruction loop for video encoding.

Clause 9. A device for processing video data, the device comprising: a dedicated chip memory; and processing circuitry coupled to the dedicated chip memory and configured to: determine a picture type of a current picture; determine, based on the picture type of the current picture, whether to write the current picture in the dedicated chip memory or whether to write the current picture a non-dedicated system memory; and write the current picture in the dedicated chip memory or the non-dedicated system memory based on the determining of whether to write the current picture in the dedicated chip memory or whether to write the current picture in the non-dedicated system memory.

Clause 10. The device of clause 9, wherein the picture type comprises one of an intra-prediction picture type, a uni-direction prediction picture type, and a bi-prediction type picture type.

Clause 11. The device of any of clauses 9 and 10, wherein the picture type comprises a first picture type, and wherein the processing circuitry is configured to: determine a second picture type of a cached picture stored in the dedicated chip memory; and compare a first priority level associated with the first picture type to a second priority level associated with the second picture type, wherein to determine whether to write the current picture in the dedicated chip memory or the non-dedicated system memory, the processing circuitry is configured to determine whether to write the current picture in the dedicated chip memory or the non-dedicated system memory based on the comparing of the first priority level to the second priority level.

Clause 12. The device of clause 11, wherein one of: the first priority level is indicative of a higher priority than the second priority level based on the first picture type being an intra-prediction picture type and the second picture type being a uni-direction prediction type; the first priority level is indicative of a higher priority than the second priority level based on the first picture type being the intra-prediction picture type and the second picture type being a bi-direction prediction type; or the first priority level is indicative of a higher priority than the second priority level based on the first picture type being the uni-direction prediction picture type and the second picture type being the bi-direction prediction type.

Clause 13. The device of any of clauses 9-12, wherein the current picture is a first picture, and wherein the processing circuitry is configured to: determine that a cached picture stored in the dedicated chip memory is not going to be used as a reference picture; and determine to write a second picture in the dedicated chip memory based on the determination that the cached picture is not going to be used as the reference picture.

Clause 14. The device of clause 13, wherein the processing circuitry is configured to: determine that the second picture is going to be used as the reference picture, wherein to determine to write the second picture, the processing circuitry is configured to determine to write the second picture in the dedicated chip memory based on the determination that the cached picture is not going to be used as the reference picture and the second picture is going to be used as the reference picture.

Clause 15. The device of any of clauses 9-14, wherein the processing circuitry is configured to: reconstruct the current picture, wherein to write the current picture, the processing circuitry is configured to write the current picture during the reconstructing of the current picture.

Clause 16. The device of clause 15, wherein to write the current picture, the processing circuitry is configured to write the current picture during the reconstructing of the current picture as part of a reconstruction loop for video encoding.

Clause 17. One or more computer-readable storage media storing instructions thereon that when executed cause one or more processors to perform the method of any of clauses 1-8.

Clause 18. A device for processing video data, the device comprising means for performing the method of any of clauses 1-8.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   determining that a current picture is of a first picture type of a plurality of picture types;

determining that a cached picture stored in a dedicated chip memory is of a second picture type of the plurality of picture types, wherein each picture type of the plurality of picture types is associated with a respective priority level of a plurality of priority levels, the respective priority level being indicative of a likelihood that a picture type, among the plurality of picture types, associated with the respective priority level is to be used as a reference picture;
   comparing a first priority level associated with the first picture type to a second priority level associated with the second picture type to determine a comparison;
   determining, based on the comparison of the first priority level to the second priority level, whether to write the current picture in the dedicated chip memory or to write the current picture in a non-dedicated system memory; and
   writing the current picture in the dedicated chip memory or the non-dedicated system memory based on the determining of whether to write the current picture in the dedicated chip memory or to write the current picture in the non-dedicated system memory.

2. The method of claim 1, wherein the first picture type or the second picture type comprises one of an intra-prediction picture type, a uni-direction prediction type, and a bi-prediction type.

3. The method of claim 1, wherein one of:
   the first priority level is indicative of a higher priority than the second priority level based on the first picture type being an intra-prediction picture type and the second picture type being a uni-direction prediction type;
   the first priority level is indicative of a higher priority than the second priority level based on the first picture type being the intra-prediction picture type and the second picture type being a bi-direction prediction type; or
   the first priority level is indicative of a higher priority than the second priority level based on the first picture type being the uni-direction prediction type and the second picture type being the bi-direction prediction type.

4. The method of claim 1, wherein the current picture is a first picture and the cached picture is a first cached picture, the method further comprising:
   determining that a second cached picture stored in the dedicated chip memory is not going to be used for inter-prediction; and
   determining to write a third picture in the dedicated chip memory based on the determination that the second cached picture is not going to be used for inter-prediction.

5. The method of claim 4, further comprising:
   determining that the third picture is going to be used for inter-prediction,
   wherein determining to write the third picture comprises determining to write the third picture in the dedicated chip memory based on the determination that the second cached picture is not going to be used for inter-prediction and the third picture is going to be used for inter-prediction.

6. The method of claim 1, further comprising:
   reconstructing the current picture,
   wherein writing the current picture comprises writing the current picture during the reconstructing of the current picture.

7. The method of claim 6, wherein writing the current picture comprises writing the current picture during the reconstructing of the current picture as part of a reconstruction loop for video encoding.

8. A device for processing video data, the device comprising:

a dedicated chip memory; and processing circuitry coupled to the dedicated chip memory and configured to:

determine that a current picture is of a first picture type of a plurality of picture types;

determine that a cached picture stored in the dedicated chip memory is of a second picture type of the plurality of picture types, wherein each picture type of the plurality of picture types is associated with a respective priority level of a plurality of priority levels, the respective priority level being indicative of a likelihood that a picture type, among the plurality of picture types, associated with the respective priority level is to be used as a reference picture;

compare a first priority level associated with the first picture type to a second priority level associated with the second picture type to determine a comparison;

determine, based on the comparison of the first priority level to the second priority level, whether to write the current picture in the dedicated chip memory or to write the current picture in a non-dedicated system memory; and write the current picture in the dedicated chip memory or the non-dedicated system memory based on the determination of whether to write the current picture in the dedicated chip memory or to write the current picture in the non-dedicated system memory.

9. The device of claim 8, wherein the first picture type or the second picture type comprises one of an intra-prediction picture type, a uni-direction prediction type, and a bi-prediction type.

10. The device of claim 8, wherein one of:

the first priority level is indicative of a higher priority than the second priority level based on the first picture type being an intra-prediction picture type and the second picture type being a uni-direction prediction type;

the first priority level is indicative of a higher priority than the second priority level based on the first picture type being the intra-prediction picture type and the second picture type being a bi-direction prediction type; or the first priority level is indicative of a higher priority than the second priority level based on the first picture type being the uni-direction prediction type and the second picture type being the bi-direction prediction type.

11. The device of claim 8, wherein the current picture is a first picture and the cached picture is a first cached picture, and wherein the processing circuitry is configured to:

determine that a second cached picture stored in the dedicated chip memory is not going to be used for inter-prediction; and determine to write a third picture in the dedicated chip memory based on the determination that the second cached picture is not going to be used for inter-prediction.

12. The device of claim 11, wherein the processing circuitry is configured to:

determine that the third picture is going to be used for inter-prediction, wherein to determine to write the third picture, the processing circuitry is configured to determine to write the third picture in the dedicated chip memory based on the determination that the second cached picture is not going to be used for inter-prediction and the third picture is going to be used for inter-prediction.

13. The device of claim 8, wherein the processing circuitry is configured to:

reconstruct the current picture, wherein to write the current picture, the processing circuitry is configured to write the current picture during the reconstructing of the current picture.

14. The device of claim 13, wherein to write the current picture, the processing circuitry is configured to write the current picture during the reconstructing of the current picture as part of a reconstruction loop for video encoding.

15. One or more non-transitory computer-readable storage media storing instructions thereon that when executed cause one or more processors to:

determine that a current picture is of a first picture type of a plurality of picture types;

determine that a cached picture stored in a dedicated chip memory is of a second picture type of the plurality of picture types, wherein each picture type of the plurality of picture types is associated with a respective priority level of a plurality of priority levels, the respective priority level being indicative of a likelihood that a picture type, among the plurality of picture types, associated with the respective priority level is to be used as a reference picture;

compare a first priority level associated with the first picture type to a second priority level associated with the second picture type to determine a comparison;

determine, based on the comparison of the first priority level to the second priority level, whether to write the current picture in the dedicated chip memory or to write the current picture in a non-dedicated system memory; and write the current picture in the dedicated chip memory or the non-dedicated system memory based on the determination of whether to write the current picture in the dedicated chip memory or to write the current picture in the non-dedicated system memory.

16. The one or more non-transitory computer-readable storage media of claim 15, wherein the first picture type or the second picture type comprises one of an intra-prediction picture type, a uni-direction prediction type, and a bi-prediction type.

17. The one or more non-transitory computer-readable storage media of claim 15, wherein one of:

the first priority level is indicative of a higher priority than the second priority level based on the first picture type being an intra-prediction picture type and the second picture type being a uni-direction prediction type;

the first priority level is indicative of a higher priority than the second priority level based on the first picture type being the intra-prediction picture type and the second picture type being a bi-direction prediction type; or the first priority level is indicative of a higher priority than the second priority level based on the first picture type being the uni-direction prediction type and the second picture type being the bi-direction prediction type.

18. A device for processing video data, the device comprising:

means for determining that a current picture is of a first picture type of a plurality of picture types;

means for determining that a cached picture stored in a dedicated chip memory is of a second picture type of the plurality of picture types, wherein each picture type of the plurality of picture types is associated with a respective priority level of a plurality of priority levels, the respective priority level being indicative of a likelihood that a picture type, among the plurality of picture types, associated with the respective priority level is to be used as a reference picture;

means for comparing a first priority level associated with the first picture type to a second priority level associated with the second picture type to determine a comparison; 5 means for determining, based on the comparison of the first priority level to the second priority level, whether to write the current picture in the dedicated chip memory or to write the current picture a non-dedicated 10 system memory; and means for writing the current picture in the dedicated chip memory or the non-dedicated system memory based on the determining of whether to write the current picture in the dedicated chip memory or to write the current 15 picture in the non-dedicated system memory.

\* \* \* \* \*